US011160090B2

(12) United States Patent
He et al.

(10) Patent No.: US 11,160,090 B2
(45) Date of Patent: *Oct. 26, 2021

(54) DYNAMICAL TIME DIVISION DUPLEX UPLINK AND DOWNLINK CONFIGURATION IN A COMMUNICATIONS NETWORK

(71) Applicant: APPLE INC., Cupertino, CA (US)

(72) Inventors: Hong He, Sunnyvale, CA (US); Jong-Kae Fwu, Sunnyvale, CA (US); Alexey Khoryaev, Nizhny Novgorod (RU); Youn Hyoung Heo, Seoul (KR)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,420

(22) Filed: Apr. 24, 2020

(65) Prior Publication Data

US 2020/0359388 A1    Nov. 12, 2020

Related U.S. Application Data

(63) Continuation of application No. 16/034,177, filed on Jul. 12, 2018, now Pat. No. 10,638,490, which is a (Continued)

(51) Int. Cl.
*H04W 72/08* (2009.01)
*H04W 52/02* (2009.01)
(Continued)

(52) U.S. Cl.
CPC .......... *H04W 72/082* (2013.01); *H01Q 1/243* (2013.01); *H01Q 3/00* (2013.01);
(Continued)

(58) Field of Classification Search
CPC ............. H04W 72/082; H04W 72/042; H04W 72/0446; H04W 72/0413; H04W 76/14;
(Continued)

(56) References Cited

U.S. PATENT DOCUMENTS

2011/0086659 A1    4/2011 Koon et al.
2011/0149813 A1    6/2011 Parkvall et al.
(Continued)

FOREIGN PATENT DOCUMENTS

CN    103037524 A    4/2013
JP    2013516100 A    5/2013
(Continued)

OTHER PUBLICATIONS

3GPP TS 36.211 , "3rd Generation Partnerhsip Project; Technical Specification Group Radio Access Network; Evolved Universal Terrestrial Radio Access (E-UTRA); Physical Channel and Modulation (Release 10)", V10.1.0, Mar. 2011, 103 Pages.
(Continued)

*Primary Examiner* — Habte Mered
(74) *Attorney, Agent, or Firm* — Stoel Rives LLP

(57) ABSTRACT

A technology is disclosed for an evolved Node B (eNB) operable to transmit a physical downlink control channel (PDCCH) to a user equipment (UE). The eNB can determine a set of configuration indication fields numbered 1 to N, included in a downlink control information (DCI) format Y carried on the PDCCH, where $$N = \left\lfloor \frac{L_{format\ Y}}{M} \right\rfloor,$$

$L_{format\ Y}$ is equal to a payload size of the DCI format Y, and M is a number of bits of each configuration indication field. The eNB can map the DCI format Y onto the PDCCH. The eNB can transmit to the UE the PDCCH with a cyclic redundancy check (CRC) scrambled by an enhanced inter-
(Continued)

ference mitigation and traffic adaptation (eIMTA) Radio-Network Temporary Identifier (RNTI) for the UE.

14 Claims, 23 Drawing Sheets

Related U.S. Application Data continuation of application No. 15/456,125, filed on Mar. 10, 2017, now Pat. No. 10,064,201, which is a continuation of application No. 15/256,105, filed on Sep. 2, 2016, now Pat. No. 9,756,649, which is a continuation of application No. 14/247,675, filed on Apr. 8, 2014, now Pat. No. 9,591,653.

(60) Provisional application No. 61/859,121, filed on Jul. 26, 2013.

(51) Int. Cl.

| | |
|---|---|
| *H04W 4/70* | (2018.01) |
| *H04W 16/28* | (2009.01) |
| *H04J 11/00* | (2006.01) |
| *H04W 28/12* | (2009.01) |
| *H04B 7/06* | (2006.01) |
| *H04L 5/00* | (2006.01) |
| *H04B 17/318* | (2015.01) |
| *H04L 5/14* | (2006.01) |
| *H04W 36/00* | (2009.01) |
| *H04W 24/08* | (2009.01) |
| *H04W 72/04* | (2009.01) |
| *H04W 74/08* | (2009.01) |
| *H04L 29/06* | (2006.01) |
| *H04W 24/02* | (2009.01) |
| *H04W 24/10* | (2009.01) |
| *H04W 36/30* | (2009.01) |
| *H01Q 1/24* | (2006.01) |
| *H01Q 3/00* | (2006.01) |
| *H04W 76/14* | (2018.01) |
| *H04W 76/11* | (2018.01) |
| *H04W 76/27* | (2018.01) |
| *H04W 76/10* | (2018.01) |
| *H04W 84/12* | (2009.01) |
| *H04W 88/06* | (2009.01) |
| *H04W 88/08* | (2009.01) |
| *H04W 84/18* | (2009.01) |
| *H04W 84/04* | (2009.01) |

(52) U.S. Cl.
CPC ......... *H04B 7/0632* (2013.01); *H04B 7/0686* (2013.01); *H04B 7/0695* (2013.01); *H04B 17/318* (2015.01); *H04J 11/0023* (2013.01); *H04L 5/0094* (2013.01); *H04L 5/14* (2013.01); *H04L 69/16* (2013.01); *H04W 4/70* (2018.02); *H04W 16/28* (2013.01); *H04W 24/02* (2013.01); *H04W 24/08* (2013.01); *H04W 24/10* (2013.01); *H04W 28/12* (2013.01); *H04W 36/0066* (2013.01); *H04W 36/0072* (2013.01); *H04W 36/0083* (2013.01); *H04W 36/30* (2013.01); *H04W 52/0209* (2013.01); *H04W 72/042* (2013.01); *H04W 72/0413* (2013.01); *H04W 72/0446* (2013.01); *H04W 74/0833* (2013.01); *H04W 76/10* (2018.02); *H04W 76/11* (2018.02); *H04W 76/14* (2018.02); *H04W 76/27* (2018.02); *H04L 5/0007* (2013.01); *H04W 84/045* (2013.01); *H04W 84/12* (2013.01); *H04W 84/18* (2013.01); *H04W 88/06* (2013.01); *H04W 88/08* (2013.01); *Y02D 30/70* (2020.08)

(58) Field of Classification Search
CPC ..... H04W 76/11; H04W 76/27; H04W 76/10; H04W 36/0072; H04W 36/30; H04W 36/0066; H04W 36/0083; H04W 4/70; H04W 28/12; H04W 24/10; H04W 24/08; H04W 24/02; H04W 16/28; H04W 74/0833; H04W 52/0209; H04B 17/318; H04B 7/0686; H04B 7/0632; H04B 7/0695; H04L 5/0094; H04L 5/14; H04L 69/16; H01Q 1/243; H01Q 3/00; H04J 11/0023
See application file for complete search history.

(56) References Cited

U.S. PATENT DOCUMENTS

| | | | |
|---|---|---|---|
| 2012/0322455 A1* | 12/2012 | Oh ............................ | H04L 5/001 455/450 |
| 2013/0044651 A1 | 2/2013 | Wang et al. | |
| 2013/0044652 A1 | 2/2013 | Wang et al. | |
| 2013/0051288 A1* | 2/2013 | Yamada .................. | H04L 5/001 370/280 |
| 2014/0044000 A1* | 2/2014 | Charbit ................. | H04B 17/345 370/252 |
| 2014/0119261 A1 | 5/2014 | Wang et al. | |
| 2014/0198690 A1* | 7/2014 | Meng ..................... | H04L 1/1822 370/280 |
| 2014/0293843 A1 | 10/2014 | Papasakellariou et al. | |
| 2014/0301255 A1 | 10/2014 | Yin et al. | |
| 2014/0334351 A1* | 11/2014 | Yin ........................ | H04L 5/0091 370/280 |
| 2015/0244485 A1 | 8/2015 | Nguyen et al. | |
| 2015/0312936 A1 | 10/2015 | Nguyen et al. | |

FOREIGN PATENT DOCUMENTS

| | | |
|---|---|---|
| KR | 20110040672 A | 4/2011 |
| KR | 1020130045240 A | 5/2013 |
| TW | 201215067 A1 | 4/2012 |
| WO | 2012139301 A1 | 10/2012 |
| WO | 2013063792 A1 | 5/2013 |

OTHER PUBLICATIONS

3GPP TS 36.212 , "3rd Generation Partnership Project; Technical Specification Group Radio Access Network; Evolved Universal Terrestrial Radio Access (E-UTRA); Multiplexing and channel coding (Release 11)", V11.3.0 Technical Specification, Jun. 2013, 3 pages.
3GPP TS 36.213 , "3rd Generation Partnership Project; Technical Specification Group Radio Access Network; Evolved Universal Terrestrial Radio Access (E-UTRA); Physical layer procedures (Release 10)", V 10.1.0, http://www.gtc.ip/3GPP3/Specs/36213-a10.pdf, Mar. 2011, 115 pages.
HTC , "Methods to Support TDD UL-DL Traffic Adaptation", R1-131205, 3GPP TSG RAN WG1 Meeting #72bis, Chicago, Illinois, USA, Agenda Item 7.2.3.2, Apr. 15-19, 2013, 3 apges.
PANASONIC , "Signalling mechanisms for TDD UL-DL reconfiguration", R1-131326, 3GPP TSG RAN WG1 Meeting #72bis, Chicago, Illinois USA, Agenda Item 7.2.3.2, Apr. 15-19, 2013, 3 pages.
Renesas Mobile Europe LTD , "Signaling mechanisms for TDD eIMTA", R1-131369, 3GPP TSG RAN WG1 Meeting #72bis, Chicago, Illinois, USA (Agenda Item 7.2.3.2), Apr. 15-19, 2013, 4 pages.
Rohde & Schwarz , "Request for clarification on checking of non-signalled FGIs", R5-132071, 3GPP TSG RAN WG5 Meeting #59, Fukuoka, Japan, Agenda Item 6.6.6, May 20-24, 2013, 3 pages.

(56) References Cited

OTHER PUBLICATIONS

Alcatel-Lucent Shanghai Bell, Alcatel-Lucent, "Comparison of signalling mechanisms for TDD UL-DL reconfiguration", R1-132053, 3GPP TSG RAN WG1 Meeting #73, Fukuoka, Japan, Agenda Item 6.2.3.2, May 20-24, 2013, 3 pages.

Intel Corporation, "Discussion on reconfiguration signaling mechanisms for TDD UL-DL reconfiguration", R1-131921, 3GPP TSG-RAN WG1 #73, Fukuoka, Japan, Agenda Item 6.2.3.2, May 20-24, 2013, 6 pages.

Le, Xu, "Realization of downlink PDCCH blind detection based on FPGA", China Excellent Master degree thesis full text database information technology, Apr. 15, 2013, pp. 17-35.

Luo, Jia, et al., "Physical Downlink Control Channel Format Selection of evolved Node B in Long Term Evolution System", 5th International Conference on BioMedical Engineering and Informatics (BMEI 2012), 2012, 5 pages.

Panasonic, "Signalling mechanisms for TDD UL-DL reconfiguration", R1-131326, 3GPP TSG RAN WG1 Meeting #72bis, Chicago, Illinois, Agenda Item 7.2.3.2, Apr. 15-19, 2013, 3 pages.

\* cited by examiner

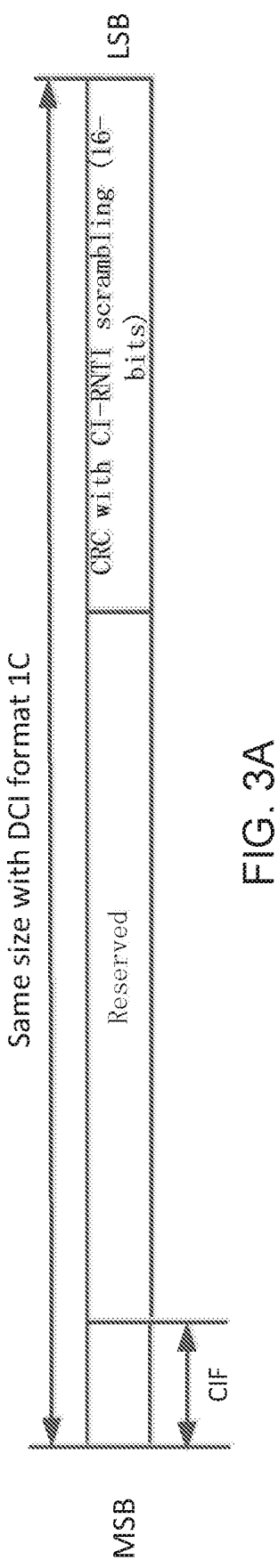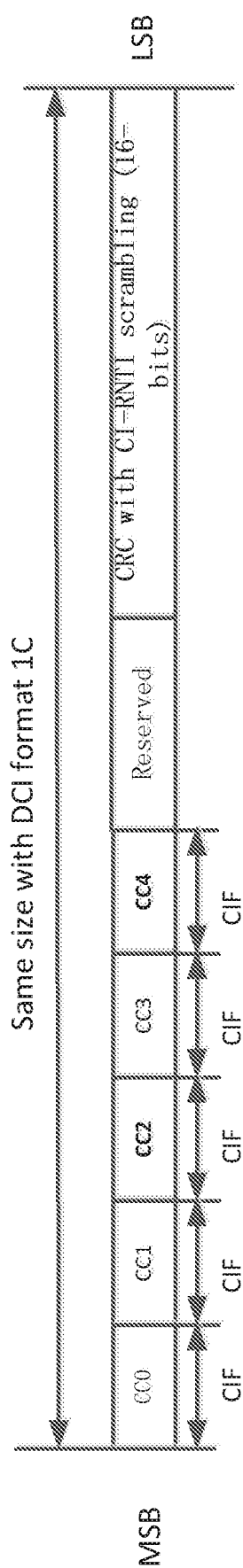
FIG. 3A
FIG. 3B

| 3-bit TCI code words ||
|---|---|
| TCI | Uplink-downlink configuration |
| 000 | 0 |
| 001 | 1 |
| 010 | 2 |
| 011 | 3 |
| 100 | 4 |
| 101 | 5 |
| 110 | 6 |
| 111 | Reserved |

FIG. 6

| TCI | 2-bit TCI code words | | | | | | |
|---|---|---|---|---|---|---|---|
| | Uplink-downlink Configuration indicated in SIB1 | | | | | | |
| | 0 | 1 | 2 | 3 | 4 | 5 | 6 |
| 00 | 0 | 1 | 2 | 3 | 4 | 5 | 6 |
| 01 | 1 | 2 | 5 | 4 | 5 | Reserved | 1 |
| 10 | 2 | 5 | Reserved | 5 | Reserved | Reserved | 2 |
| 11 | 5 | 4 | Reserved | Reserved | Reserved | Reserved | 5 |

FIG. 7

| Configurations for TDD UL-DL reconfiguration indication | | | | | | | | |
|---|---|---|---|---|---|---|---|---|
| Configurations | RRH #0 | | RRH #1 | | | | RRH #2 | |
| | UE 1 | UE 2 | UE 4 | UE 5 | UE 6 | UE 7 | | UE 8 |
| tdd-Config-RNTI | | | | X | | | | |
| tdd-Config-Index | 1 | 1 | 2 | 2 | 2 | 3 | | 3 |

FIG. 17

| Configurations for TDD UL-DL reconfiguration indication | | | | |
|---|---|---|---|---|
| Configurations | UE 0 | | UE 1 | |
| | Carrier 0 | Carrier 1 | Carrier 0 | Carrier 1 |
| tdd-Config-RNTI | Y/X | 2 | Y | 2 |
| tdd-Config-Index | 1 | 2 | 1 | 2 |

FIG. 19

DYNAMICAL TIME DIVISION DUPLEX UPLINK AND DOWNLINK CONFIGURATION IN A COMMUNICATIONS NETWORK

RELATED APPLICATIONS

This application is a continuation of U.S. patent application Ser. No. 15/456,125 filed Mar. 10, 2017, which is a continuation of U.S. patent application Ser. No. 15/256,105 filed Sep. 2, 2016, which is a continuation of U.S. patent application Ser. No. 14/247,675, filed Apr. 8, 2014, which claims the benefit of reference U.S. Provisional Patent Application Ser. No. 61/859,121 filed Jul. 26, 2013, each of which are incorporated by reference herein.

BACKGROUND

In wireless communications systems downlink and uplink transmissions may be organized into two duplex modes: frequency division duplex (FDD) mode and time division duplex (TDD) mode. The FDD mode uses a paired spectrum where a gap in frequency domain is used to separate uplink (UL) and downlink (DL) transmissions. In TDD systems, an unpaired spectrum may be used where both UL and DL are transmitted over the same carrier frequency. The UL and DL are separated in non-overlapped time slots in the time domain.

Third generation partnership project (3GPP) long term evolution (LTE) TDD homogeneous systems operate synchronously in order to avoid UL/DL inter-cell interference between base stations or nodes, such as enhanced Node Bs (eNode Bs) and/or mobile terminals, such as user equipment (UEs). A geographic region served by an eNode B is commonly referred to as a cell. Cells in a network typically use the same UL/DL configuration for synchronous operation of the LTE-TDD homogeneous systems. The UL/DL configuration includes frame configuration and UL/DL resource allocation within one radio frame. Additionally, the network can use the UL/DL configuration to align frame transmission boundaries in time. The synchronous operation can be effective to mitigate interference. However, the synchronous operation is not optimized for traffic adaptation and can significantly degrade packet throughput for small cells in a heterogeneous network (HetNet).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3A depicts a downlink control information (DCI) format for a single component carrier (CC) supporting dynamic UL/DL reconfiguration in accordance with an example;

FIG. 3B depicts a DCI format for a multi-CC supporting dynamic UL/DL reconfiguration in accordance with an example;

FIG. 6 shows a table depicting a coding of 3-bit target cell identity (TCI) code words used for TDD UL/DL configuration indication in accordance with an example;

FIG. 7 shows a table depicting a coding of 2-bit TCI code words used for TDD UL/DL configuration indication in accordance with an example;

FIG. 17 illustrates a table with the configurations for the TDD UL/DL reconfiguration indication in accordance with an example;

FIG. 19 illustrates a table of configurations for TDD UL/DL reconfiguration indication in accordance with an example;

Figure 1:
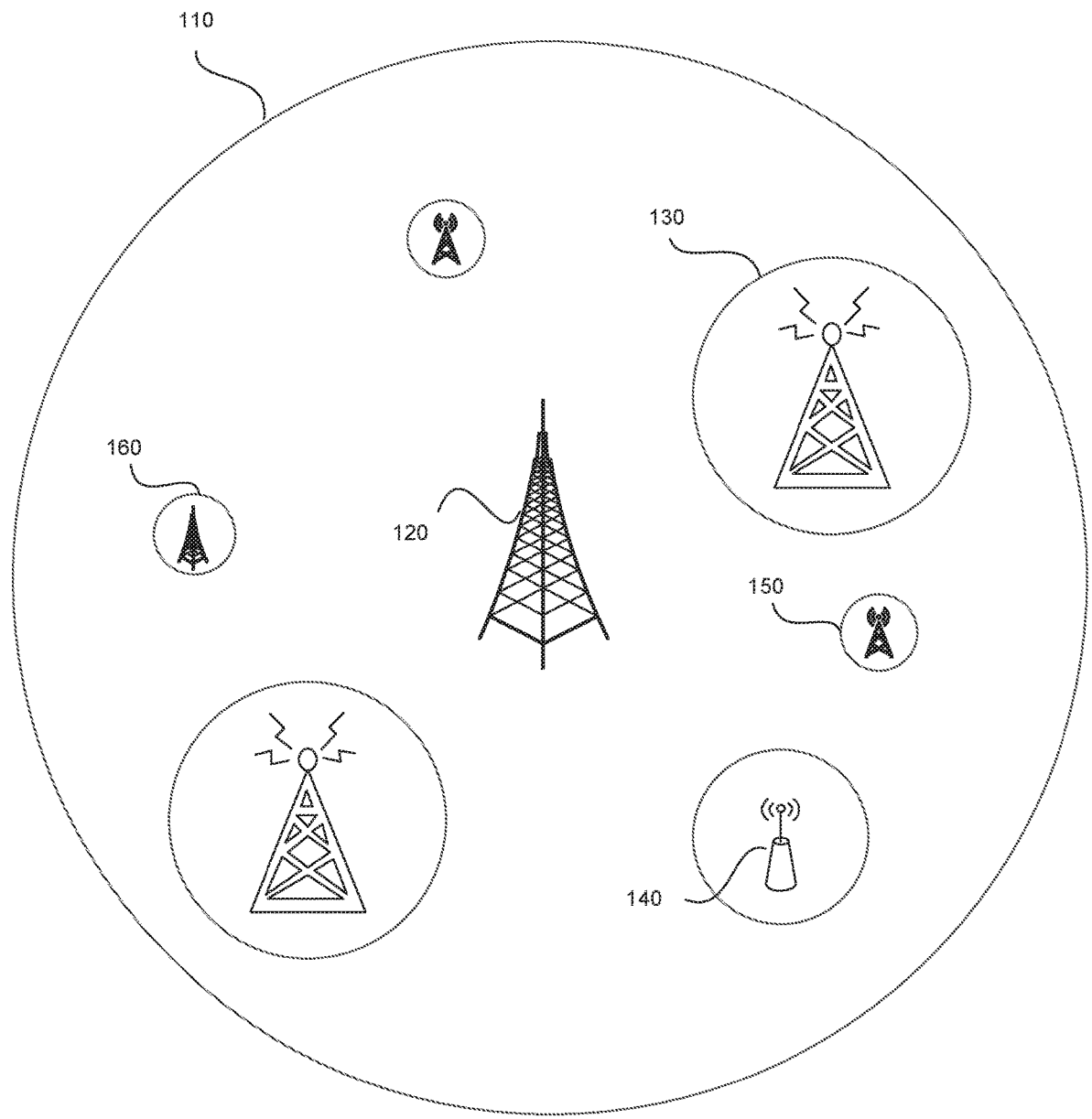
FIG. 1 depicts a multiple Radio Access Technology (RAT) heterogeneous network (HetNet) with a macro cell overlaid with layers of lower power nodes in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Mobile devices are increasingly equipped with multiple radio access technologies (multi-RAT) that can connect to and choose among the different types of radio technologies, including cellular technologies that use licensed portions of the radio spectrum, and wireless local area network (WLAN) and personal area network (PAN) technologies that typically use unlicensed portions of the radio spectrum.

In homogeneous networks, a base station or macro node can provide basic wireless coverage to mobile devices within the node coverage (i.e. the cell). Heterogeneous networks (HetNets) were introduced to handle the increased traffic loads on the macro nodes due to increased usage and functionality of mobile devices.

A HetNet can be comprised of multiple types of radio access nodes and/or radio access technologies in a wireless network. HetNets can include macro nodes, such as enhanced node Bs (eNBs) or base stations (BSs), overlaid with layers of small nodes or cells, such as micro-nodes, pico-nodes, femto-nodes, home-nodes, relay stations, WiFi access points (APs), and so forth. The small nodes, also referred to as low power nodes, can be deployed in a non-uniform or uncoordinated manner within the coverage area of the macro nodes (i.e. the cell). The macro nodes can be used for basic coverage, and the small nodes can be used to fill coverage holes, to improve capacity in hot-zones or at the boundaries between the coverage areas of the macro nodes, and improve indoor coverage where building structures impede signal transmission. FIG. 1 depicts a multi-RAT HetNet in a macro-cell 110 with a macro-node 120 overlaid with layers of lower power nodes or small nodes including micro-nodes 130, pico-nodes 140, femto-nodes 150, and WiFi APs 160 or other types of WLAN nodes or PAN nodes.

High demand for increased throughput by UEs can be satisfied by deploying a cluster of small nodes to provide an acceptable quality of service (QoS) for the UEs. In one embodiment, dense clusterization of small nodes can be used at hotspots for providing closer serving nodes to more UEs for increased network capacity. As the number of small nodes deployed in a given area increases, the inter-small node interference can increase. As inter-small node interference reaches a threshold limit, there is an upper bound constraint on the number of small nodes that can be deployed in a hotspot area.

Traditionally, the disadvantage of the high density deployment or clusterization of small nodes is the level of inter-small node interference, e.g. the level of interference that occurs between multiple small nodes in a dense area. The inter-small node interference decreases the signal to noise ratio (SNR) and/or the signal to interference plus noise ratio (SINR) between UEs and small nodes, resulting in lower or decreased UE throughput.

Figure 2A:
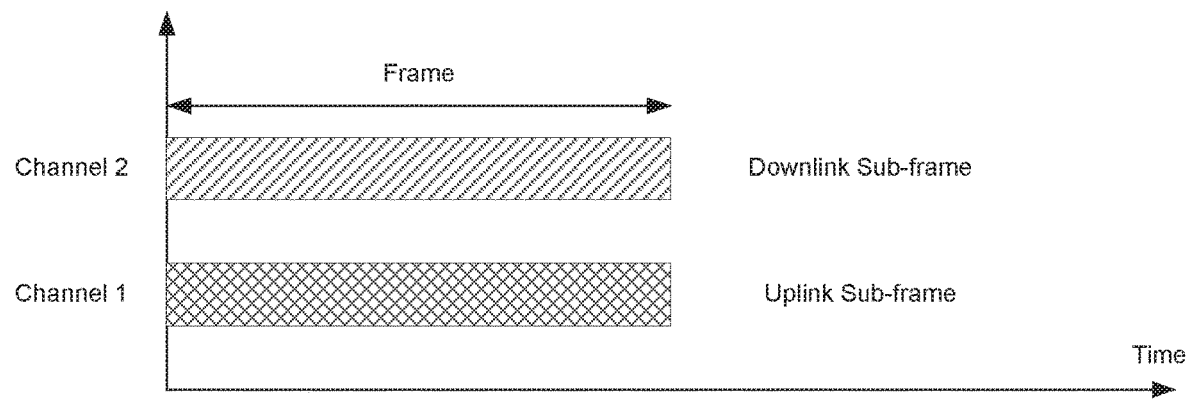
FIG. 2a illustrates of a uplink/downlink (UL/DL) subframe separated in the frequency domain for a frequency division duplex (FDD) mode in accordance with an example.
Figure 2B:
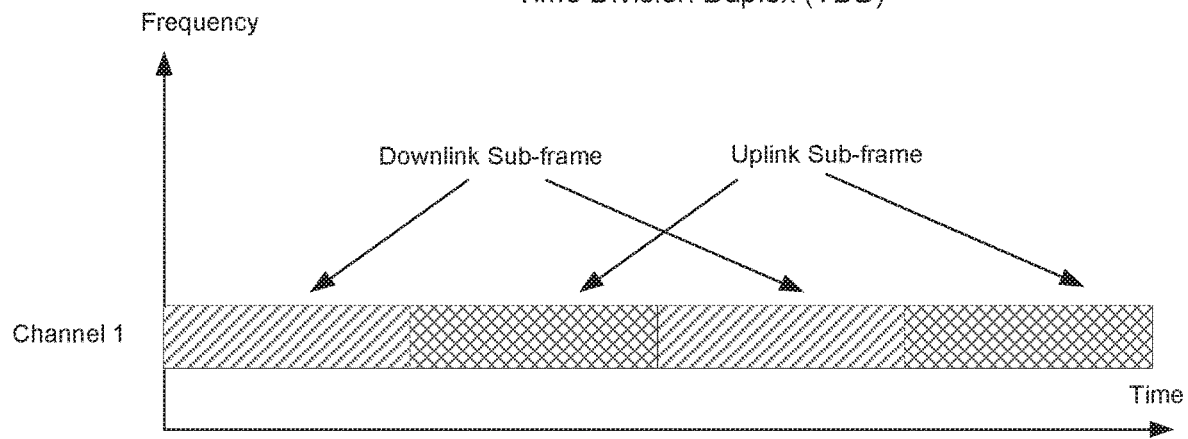
FIG. 2b illustrates of UL/DL subframes sharing a carrier frequency in a time division duplex (TDD) mode in accordance with an example.

In a wireless communications system, such as a third generation partnership project (3GPP) long term evolution (LTE) system, downlink (DL) and uplink (UL) transmissions can be organized into two duplex modes: frequency division duplex (FDD) mode and time division duplex (TDD) mode. An FDD mode can use a paired spectrum where a gap in frequency domain is used to separate uplink (UL) transmissions from downlink (DL) transmissions. FIG. 2A illustrates of a UL and DL subframe separated in the frequency domain for the FDD mode. In TDD systems, an unpaired spectrum may be used where both UL and DL are transmitted over the same carrier frequency. The UL transmissions and DL transmissions are separated in the non-overlapping time slots in the time domain. FIG. 2B illustrates UL and DL subframes sharing a carrier frequency in the TDD mode. As used herein, the term UL/DL is intended to refer to the uplink and the downlink.

A wireless communications system can operate synchronously in order to avoid UL/DL inter-cell interference between base stations, such as eNode Bs and/or mobile terminals, such as UEs. Cells in a wireless communications system can use the same UL/DL configuration for a synchronous operation of the wireless communications system. The UL/DL configuration can include a frame configuration and UL/DL resource allocations.

The usage of a same frame configuration in a HetNet deployment scenario can degrade a quality of service (QoS) for a UE in the communications network. Data traffic in HetNet scenarios can vary overtime domains or cell domains. For example, a selected set of cells can have varied dominant traffic in either the DL transmission direction or the UL transmission direction over time. The dominant traffic transmission direction can use more spectrum resources than the non-dominant transmission direction to improve the QoS and systematic throughput performance for a lower or medium traffic load. In HetNet deployment scenarios, because small cells are closer in proximity to the end users, the level of isolation between eNode Bs is higher so that a large portion of eNode Bs can be considered isolated cells. Isolated cells are cells with small nodes that create relatively low levels of inter-cell interference with other small nodes in a macro cell.

In one embodiment, each small node in the isolated cells can dynamically configure or reconfigure the UL/DL configuration of the small node to adapt to changing real time data traffic conditions or instantaneous data traffic conditions within the serving cell. In another embodiment, each small node in isolated cells can dynamically configure or reconfigure the UL/DL configuration of the small node by using cyclic redundancy check (CRC) parity bits scrambled with a TDD-Config-RNTI assigned for eIMTA operation. In one embodiment, signaling options such as a system information block (SIB), paging, a radio resource control (RRC), medium access control (MAC) signaling, and/or L1 signaling can be used for support of UL/DL reconfiguration in different traffic adaptation time scales. For example, L1 signaling can be used for UL/DL reconfiguration as a robust signaling option with lower control overhead and shorter latency.

In one embodiment, blinding decoding can be used with selected signaling options, such as L1 signaling. In another embodiment, a DCI format, such as a physical downlink control channel (PDCCH), can be used to signal a carrier-independent UL/DL configuration information for each serving cell. FIGS. 3A & 3B illustrate DCI formats used to indicate a carrier-independent UL/DL configuration. The DCI formats, such as PDCCH, in FIGS. 3A & 3B include TDD UL/DL Configuration Indicator Fields (CIFs) for selected UL/DL configuration. FIG. 3A depicts a DCI format, such as PDCCH, for a single component carrier (CC) supporting dynamic UL/DL reconfiguration. FIG. 3B depicts a DCI format, such as PDCCH, used for a multi-CCs supporting dynamic UL/DL reconfiguration. In one embodiment, a DCI format can be used for a CoMP scenario 4 to achieve independent UL/DL configuration for each Transmission Point (TP).

In one embodiment, the network can be configured to order a DCI signal for traffic adaption in a TDD system. In one embodiment, a unified DCI format for carrying UL/DL configuration information can be dynamically updated and transmitted at selected time intervals. For example, the DCI format can be dynamically updated every 10 millisecond. In another embodiment, the DCI format can enable independent UL/DL configuration for each serving cell in for selected deployment scenarios. The selected deployment scenarios can include: a single carrier scenario; a cooperative multiple point (CoMP) scenario, such as CoMP scenario 3 or a CoMP scenario 4; a carrier aggregation (CA) scenario; and a CoMP scenario with CA enabled on remote radio heads (RRHs), such as a combination of CA and CoMP scenario.

Figure 4:
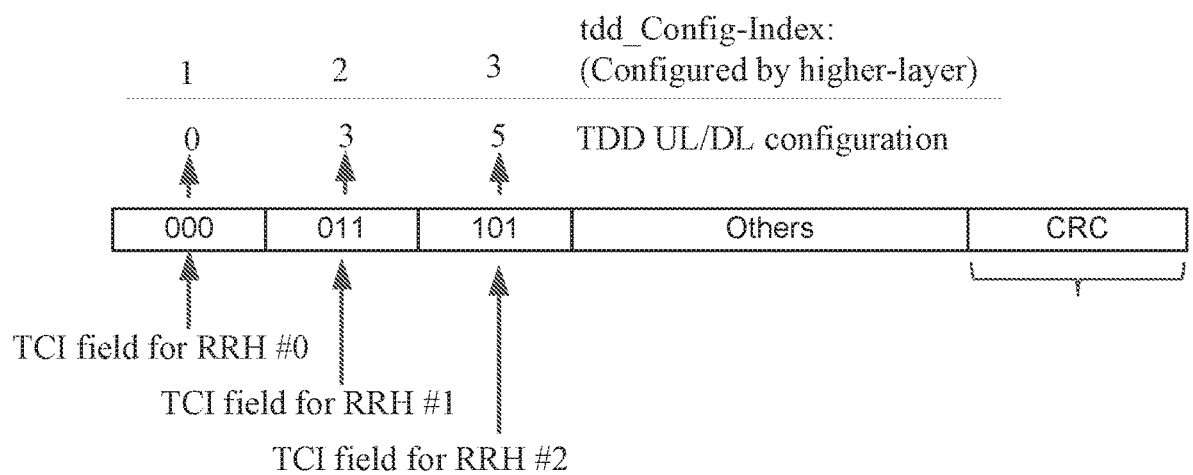
FIG. 4 depicts a DCI format X that can be used to indicate a TDD UL/DL configuration in accordance with an example.

FIG. 4 illustrates a new DCI format X, such as PDCCH, that can be used to indicate a TDD UL/DL configuration with an M-bit TDD UL/DL configuration indicator field (CIF), used to indicate a UL/DL configuration. In one embodiment, M can designate a number or a literal. The X of the DCI format X can designate a number or a literal. A DCI format X can carry TDD UL/DL configurations of multiple serving cells simultaneously. In one embodiment, the DCI format can be transmitted on all fixed DL subframes, i.e. subframe 0, subframe 1, subframe 5, and subframe 6. In another embodiment, the DCI format can be transmitted on a subset of the fixed subframes. In another embodiment, the DCI format can be transmitted on all DL subframes, including both fixed DL subframes and flexible subframes. One advantage of transmitting the DCI format on all DL subframes can be to enable a discontinuous reception (DRX) UE to acquire an actual UL/DL configuration being used by the eNode B when the DRX UE wakes up in a flexible subframe.

In one embodiment, the DCI format X can include a set of TDD UL/DL Configuration Indicator (TCI) fields 1, 2, . . . , N, where N is signaled by the eNode B within RRC signaling for each eIMTA-enabled UE. In another embodiment, the DCI format X can include a set of TDD UL/DL Configuration Indicator (TCI) fields 1, 2, . . . , N, where N can calculated by the UE using $$N = \left\lfloor \frac{L_{format\ Y} - R_{others}}{M} \right\rfloor,$$

where $L_{format\ Y}$ is equal to the payload size of one of an existing DCI format Y before cyclic redundancy check (CRC) attachment, format Y is mapped onto the common search space (CSS) (wherein the payload size of the DCI format size includes any padding bits appended to format Y), and $R_{others} \geq 0$ is a number of information bits used for other selected applications. In one embodiment, the selected applications can be transmission power control (TPC) commands for physical uplink shared channel (PUSCH) transmission on flexible subframes.

In one embodiment, when the total bits number of N TCI fields is less than the selected DCI format size Y on CSS or $$\left\lfloor \frac{L_{format\ Y} - R_{others}}{M} \right\rfloor < \frac{L_{format\ Y} - R_{others}}{M}, \text{ where } \left\lfloor \frac{L_{format\ Y} - R_{others}}{M} \right\rfloor$$

rounds down to the nearest integer. For example, $\lfloor 2.3 \rfloor = 2$. In one embodiment, when L=17, R=0, and M=3, then $\lfloor L/3 \rfloor = 5 < 5.7$ and 2 bits can be appended for DCI format X aligned with DCI format Y size: 17 bits besides 5 3-bit TCI fields.

Figure 5:
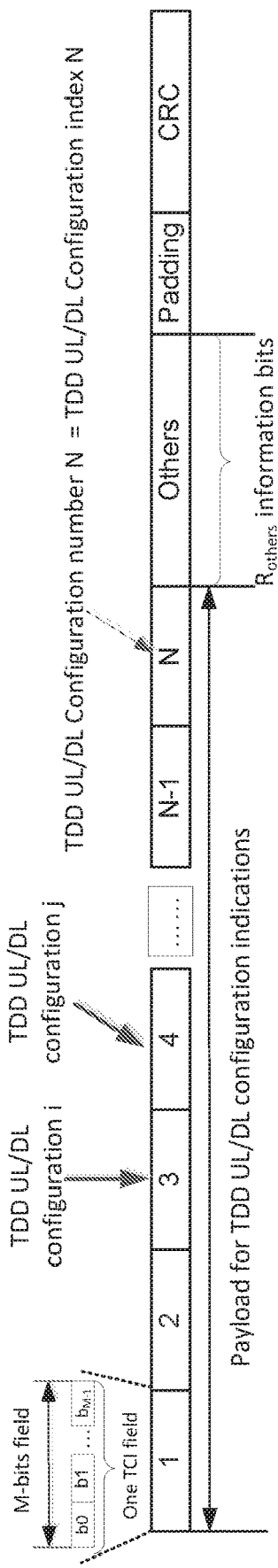
FIG. 5 depicts a DCI format for UL/DL configuration indications in accordance with an example.

In one embodiment, information bit(s) with a predefined value of either 0 or 1 can be appended to DCI format X until the payload size equals that of a DCI format Y. In one embodiment, the information bits can be appended to a DCI format X until the payload size of the DCI format X equals a payload size of the DCI format Y, where the number of bits of the DCI format Y is bandwidth-dependent FIG. 5 illustrates an exemplary embodiment of the DCI format for UL/DL configuration indications. In one embodiment, the DCI format Y can be a DCI format 0/1A/3/3A that can be transmitted on a CSS of a PDCCH. In another embodiment, the DCI format Y can be a DCI format 1C that can be transmitted on a CSS of a PDCCH.

FIG. 5 further illustrates that for a selected UE, the TDD UL/DL configuration of a serving cell can be jointly coded with other TDD UL/DL configurations for other serving cells in a PDCCH with DCI format X used for UL/DL reconfiguration indication, wherein cyclic redundancy check (CRC) parity bits can be scrambled with a TDD-Config-RNTI assigned for eIMTA operation. In one embodiment, where a group of UEs or multiple serving cells of a UE can receive dedicated and independent TDD UL/DL configurations by the same TDD-Config-RNTI, an index can be provided that indicates the M-bit TCI fields associated with the serving cell of the receiving UE for the UL/DL configuration indication. In one embodiment, M can be 3, but larger or smaller TCI code words can also be used.

FIG. 6 shows a table depicting a coding of 3-bit target cell identity (TCI) code words used for TDD UL/DL configuration indication. One advantage of a 3-bit TCI can be to provide a full-range flexibility for UL/DL reconfiguration.

In another embodiment, M can be 2. FIG. 7 shows a table depicting a coding of 2-bit TCI code words used for a TDD UL/DL configuration indication. For a 2-bit TCI, the UL subframes according to the TDD UL/DL configuration indicated in a system information block type 1 (SIB1) message can be configured as flexible subframes (FlexSF). In one embodiment, for a 2-bit TCI, the UL/DL reconfiguration can be invisible to legacy UEs and can enable avoiding a negative impact on a radio resource management (RRM) measurement of legacy UEs. One advantage of using a 2-bit TCI can be to reduce control overhead of a communications network. In one embodiment, for each TDD UL/DL configuration indicated in a SIB1 message, a set of UL/DL configuration associated with the 2-bit TCI field can be defined for UL/DL reconfiguration indication.

In one embodiment, an information element (IE) can be a TDD-PDCCH-Config, where the TDD-PDCCH-Config can be used to specify the RNTI(s) and index(es) used for flexible UL/DL configuration indications. In one embodiment, the TDD UL/DL re-configuration function can be setup or released with the IE. In another embodiment, the IE can be a TDD-Config-RNTI, where the TDD-Config-RNTI can be an RNTI for a TDD UL/DL configuration indication using DCI format X. In another embodiment, the IE can be a TDD-Config-Index with an index of K. The TDD-Config-Index can be a parameter used to indicate an index to the TDD UL/DL configuration field in a DCI format X associated with a serving cell of an eIMTA-enabled UE. In one example, K can be 16.

Figure 8:
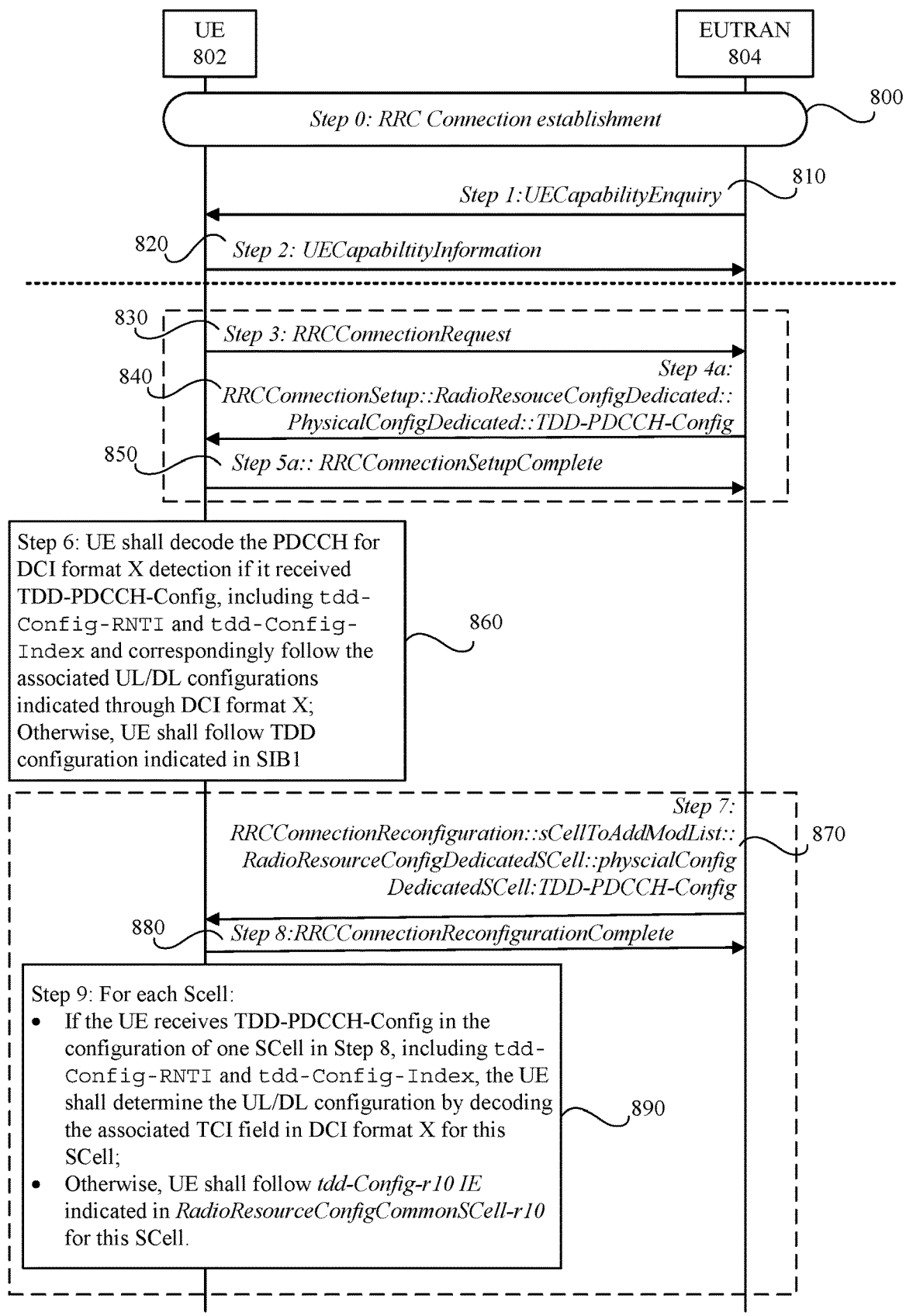
FIG. 8 illustrates a signaling flow between a user equipment (UE) and a EUTRAN to establish a dynamic UL/DL configuration in accordance with an example.

FIG. 8 illustrates a signaling flow between a UE 802 and an evolved universal terrestrial radio access network (EU-TRAN) 804 using an RRC connection setup message to setup a dynamic UL/DL configuration. When the EUTRAN 804 does not receive the UE capabilities from the core network, such as when the UE 802 is in an evolved packet system (EPS) mobility management (EMM) DEREGISTERED mode, the EUTRAN 804 can request that the UE 802 use a UE capability transfer procedure to provide the capabilities of the UE 802 to the EUTRAN 804. The UE capability transfer can include step 0 (800) for establishing an RRC connection between the UE 802 and the EUTRAN 804. After establishing the RRC connection 800 between the UE 802 and the EUTRAN 804, then in step 1 (810) the EUTRAN 804 can send a UECapabilityEnquiry to the UE 802. After the UECapabilityEnquiry 810 is received by the UE 802, in step 2 (820) the UE 802 can send the EUTRAN 804 a UECapabilityInformation message. The UECapabilityInformation message can indicate the capability of the UE 802 to support TDD UL/L re-configuration.

In one embodiment, the IE can be a PhyLayerParameters-v1240, where the PhyLayerParameters-v1240 indicates a UE capability of TDD UL/DL reconfiguration. The PhyLayerParameters-v1240 can be defined as:

```
-- ASN1START
PhyLayerParameters-v1240 ::= SEQUENCE {
    TDD-configuration-r12        ENUMERATED {supported}
    OPTIONAL,
}
-- ASN1STOP
```

In another embodiment, the IE can be a TDD-configuration-r12, where the TDD-configuration-r12 indicates whether the UE 802 supports a TDD UL/DL reconfiguration capability.

Steps 3-5a of FIG. 8, show the steps for a RRC connection establishment procedure to transfer the parameters for the TDD UL/DL reconfiguration capability between an eIMTA capable UE and an EUTRAN. In Step 3 (830), the UE 802 can send an RRCConnectionRequest to the EUTRAN 804. In Step 4a (840), when the EUTRAN 804 receives the UE capability of eIMTA support, based on a flexible TDD UL/DL configuration, an IE TDD-PDCCH-Config can be included in a RRCConnectionSetup message. In one embodiment, the RRCConnectionSetup message can include: RadioResourceConfigDedicated information, PhysicalConfigDedicated information, and/or TDD-PDCCH-Config information. In one embodiment, when the TDD-PDCCH-Config IE is not included in the RRCConnectionSetup message, the UE 802 can follow a TDD UL/DL configuration procedure as indicated in a system information block 1 (SIB1) for Data transmission and reception. In step 5a (850), the UE 802 can send the EUTRAN 804 an RRCConnectionComplete message. In step 6 (860), the UE 802 can decode the PDCCH for DCI format X detection when the UE 802 receives the TDD-PDCCH-Config message, including a TDD-Config-RNTI message and a TDD-Config-Index message. In one embodiment, the UE 802 can follow the associated TDD UL/DL configurations indicated in the DCI format X. In another embodiment, the UE 802 can follow TDD UL/DL configuration indicated in a SIB1.

Step 7 (870) shows, for an SCell in a CA scenario, the E-UTRAN 804 can use dedicated signaling to provide a TDD-PDCCH-Config IE to the UE 802 that supports TDD UL/L reconfiguration when adding the SCell. When the UE 802 receives the TDD-PDCCH-Config, UE 802 can monitor a PDCCH with a DCI format X, where the CRC is scrambled by the assigned TDD-Config-RNTI. Additionally, when the UE 802 receives TDD-PDCCH-Config, the UE 802 can obtain a UL/DL configuration for the associated serving cell upon receiving DCI format X on a PDCCH, according to the TDD-Config-Index. Step 8 (880) shows the UE 802 sending the EUTRAN 804 an RRCConnectionReconfigurationComplete message.

In one embodiment, step 7 (870), step 8 (880) and step 9 can occur for a UE capable of both Carrier Aggregation (CA) and eIMTA support when eIMTA is used in the added Secondary Cell (SCell). In one embodiment, in step 9 (890), for each SCell, when the UE 802 receives a TDD-PDCCH-Config message in the configuration of one SCell in Step 8 the UE 802 can determine the UL/DL configuration by decoding the associated TCI field in DCI format X for this SCell. In one embodiment, the TDD-PDCCH-Config message can include the TDD-Config-RNTI message and the TDD-Config-Index message. In another embodiment, in step 9 (890), the UE 802 can determine the UL/DL configuration upon receiving DCI format X according to the received TDD-Config-r10 IE of a RadioResourceConfigCommonSCell-r10 for the SCell. In one embodiment, when no TDD-Config-RNTI is received, the UE can monitor and decode the PDCCH following a UL/DL configuration indicated in SIB1.

Figure 9:
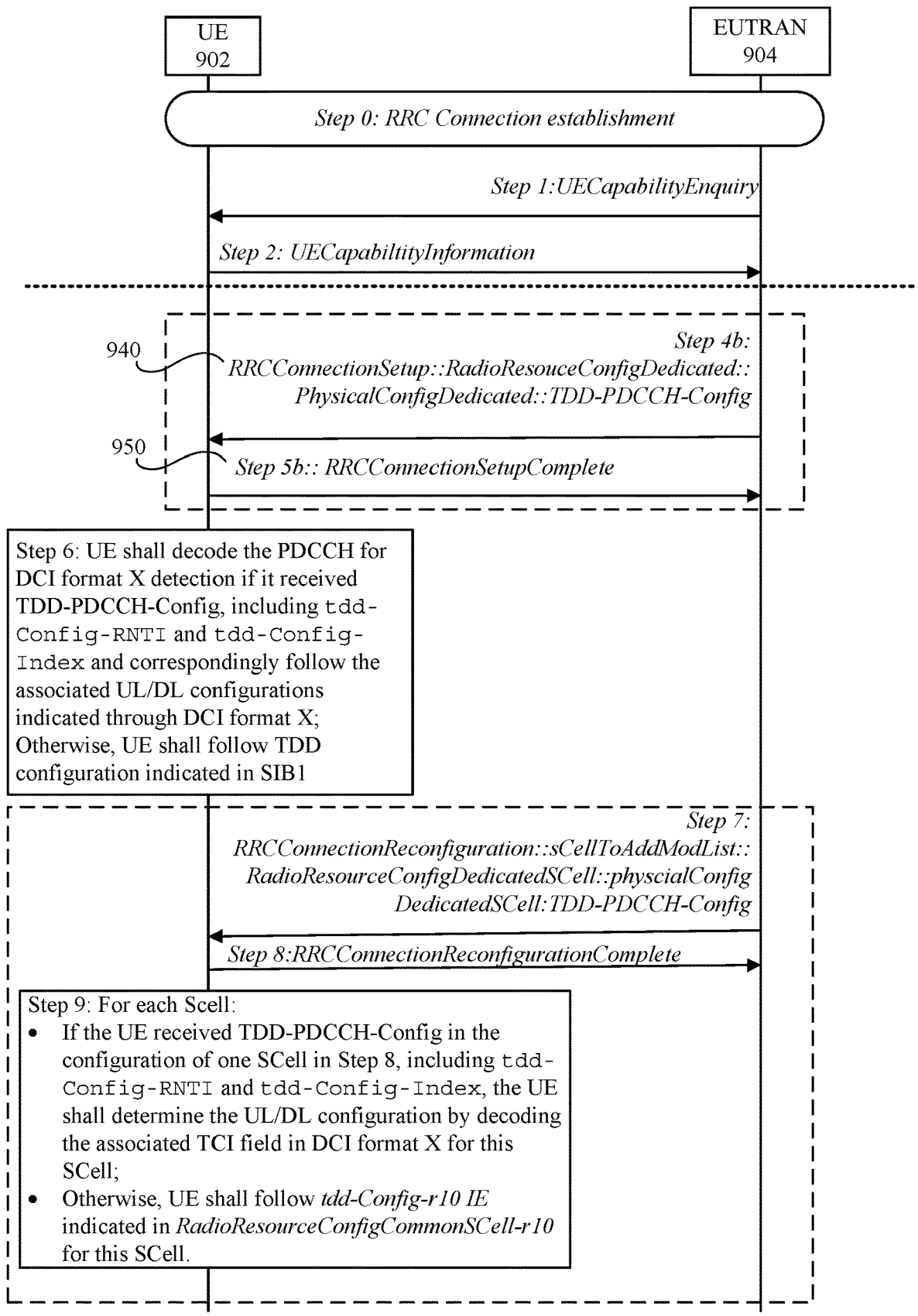
FIG. 9 illustrates a signaling flow between a UE and a evolved universal terrestrial radio access network (EUTRAN) to establish a dynamic UL/DL configuration in accordance with an example.

FIG. 9 illustrates an alternative signaling flow between a UE 902 and a EUTRAN 904 using an RRC connection reconfiguration message to establish a dynamic UL/DL configuration. Steps 0 through step 2 are the same as in FIG. 8 discussed in the preceding paragraphs. FIG. 9 does not included step 3 as in FIG. 8. After the UE 902 sends the EUTRAN 904 a UECapabilityInformation message in step 2, in step 4b (940) the EUTRAN 904 sends the UE 902 a RRCConnectionReconfiguration message. The RRCConnectionReconfiguration message can include a RadioResourceConfigDedicated message and/or a PhysicalConfigDedicated::TDD-PDCCH-Config message. In Step 5b, the UE 902 sends a RRCConnectionReconfigurationComplete message to the EUTRAN 904. The remaining steps in FIG. 9 are the same as the steps discussed in the preceding paragraphs for FIG. 8.

Figure 10:
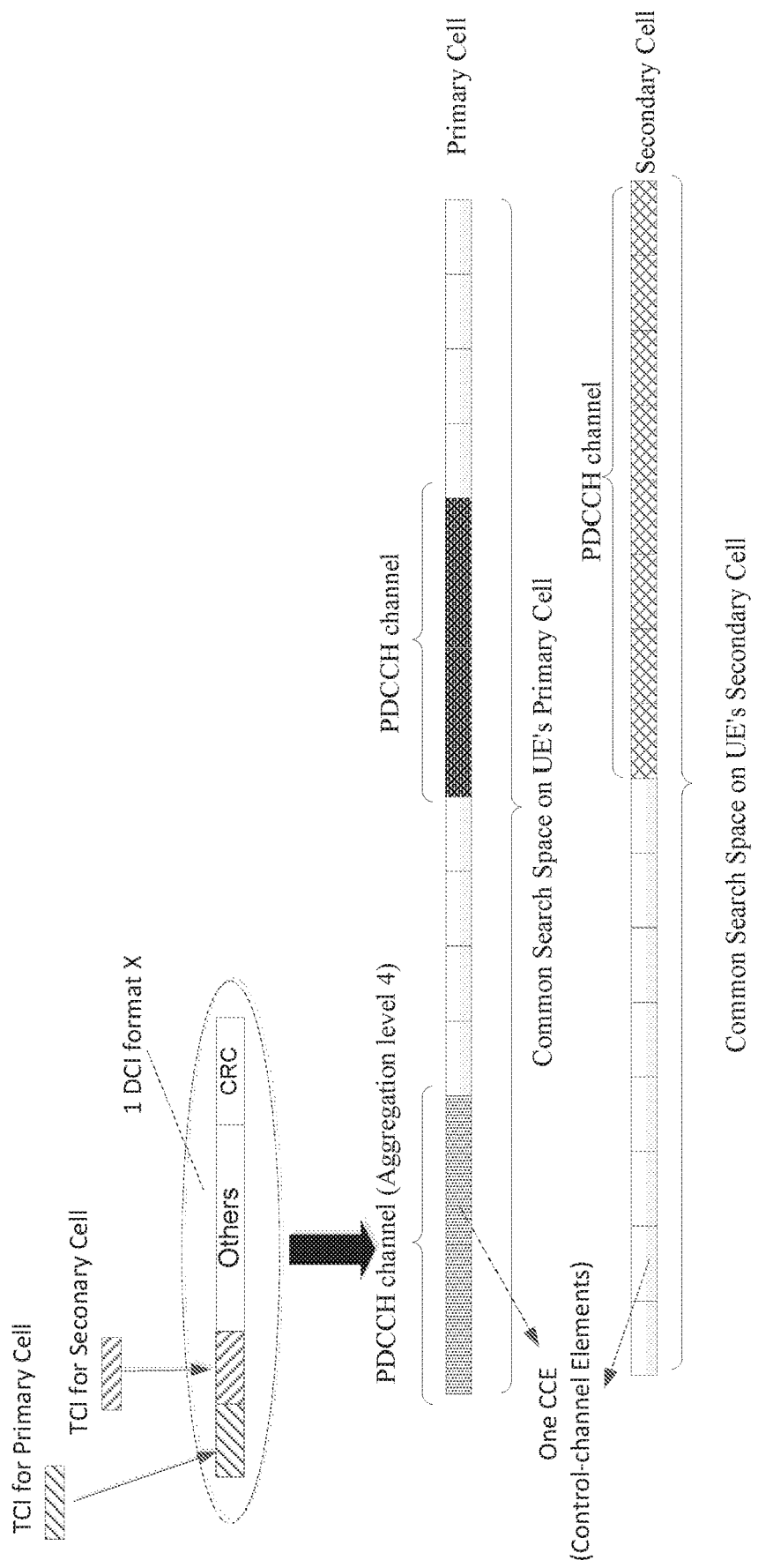
FIG. 10 illustrates a physical downlink control channel (PDCCH) that can be used for a DCI format X transmission in accordance with an example.

FIG. 10 illustrates a PDCCH that can be used for a DCI format X transmission. FIG. 10 further shows that for searching the DCI format X with a CRC scrambled with an assigned RNTI for eMTA, a UE configured with an UL/DL reconfiguration can monitor a CSS on the PDCCH in every non-DRX fixed DL subframe according to a UL/DL configuration indicated in SIB1 at each of the aggregation levels 4 and 8 on a primary cell (PCell). In another embodiment, for searching the DCI format X with the CRC scrambled with the assigned RNTI for eIMTA, the UE configured with an UL/DL reconfiguration can monitor a CSS on PDCCH in every non-DRX fixed DL subframe at monitoring aggregation level 8 on a PCell to reduce the blind decoding attempts.

Figure 11:
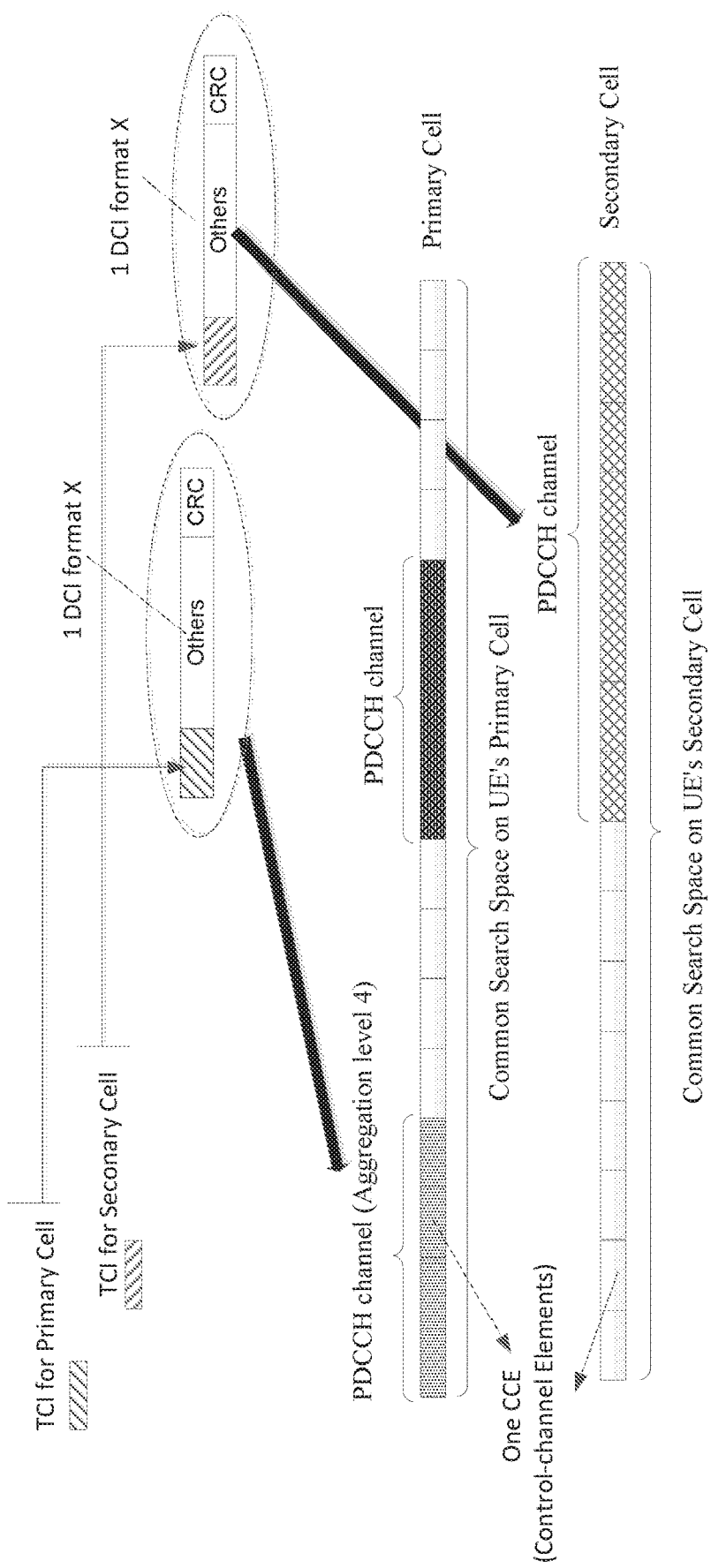
FIG. 11 illustrates a common search space (CSS) on a PDCCH can be used for transmission of a DCI format X in accordance with an example.

FIG. 11 illustrates a CSS on a PDCCH that can be used for transmission of a DCI format X. In this example, the UL/DL configuration information for a secondary cell (SCell) is carried on a DCI format X transmitted on a CSS of a PDCCH channel of the SCell. In one embodiment, the DCI format X can include an UL/DL configuration indication field for different serving cells that can be concatenated onto a DCI format X and transmitted on a PCell of the UE. In another embodiment, the DCI format X that includes the UL/DL configuration indication field for different serving cell can be deconstructed and transmitted on its own common search space of a PDCCH of the serving cells. FIG. 11 further illustrates a DCI format X indicating that the UL/DL configuration of the PCell is transmitted using a CSS on a PDCCH of the PCell, and the UL/DL configuration of the SCell is coded into another DCI format X that can be transmitted using a CSS on a PDCCH of the SCell. One advantage of transmitting a UL/DL configuration of different cells separately (i.e. PCell and SCell) on the common search space of the different serving cells can be to ensure that the UL/DL reconfiguration is applicable irrespective of a backhaul latency between two serving cells, as shown with the PCell and SCell in FIG. 11.

Figure 12:
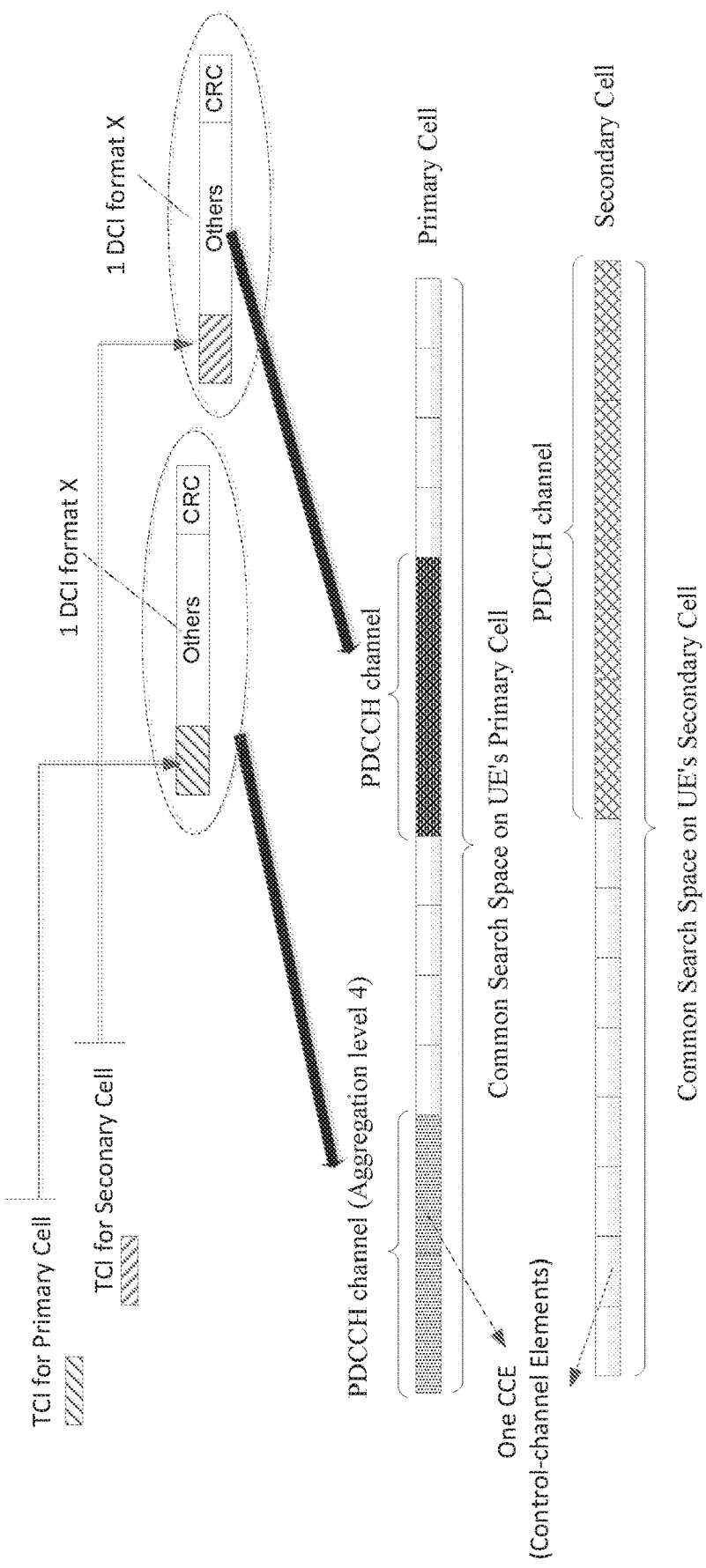
FIG. 12 illustrates a DCI format X that includes a UL/DL configuration indication field in accordance with an example.

FIG. 12 illustrates a DCI format X that includes a UL/DL configuration indication field for different serving cells that is deconstructed into two separate DCI formats and respectively mapped onto different PDCCH channels within a CSS of the PCell. In one embodiment, different DCI formats can be differentiated with different TDD-Config-RNTI values and with the same DCI format sizes.

In one embodiment, the DCI format X can be transmitted using a UE-specific search space (USS) on a PDCCH or an enhanced PDCCH (EPDCCH). The PDCCH or the EPDCCH can be determined by an assignment TDD-Config-RNTI configured by higher layer signaling, as shown in FIGS. 8 and 9. In one embodiment, the location of multiple USSs associated with different RNTI can be on a PCell. In another embodiment, the location of multiple USSs associated with different RNTI can be on each serving cell that the UL/DL configuration targets, as indicated in the DCI format X.

In one embodiment, a UE-group-common search space on a PDCCH can be associated with an assigned radio network temporary identifier (RNTI) value. For example, the RNTI value can be a TDD-Config-RNTI. For each serving cell on that the physical downlink control channel (PDCCH) is monitored, the control channel elements (CCEs) corresponding to a PDCCH candidate m of a UE-group-common search space with CCE aggregation level L in subframe k ($S_k^{(L)}$) can be determined using:

$$L\{(Y_k+m') \bmod \lfloor N_{CCE,k}/L \rfloor\}+i,$$

where $Y_k$ is defined as:

$$Y_k=(A \cdot Y_{k-1}) \bmod D$$

wherein i=0, L, L−1 is a CCE index within a aggregation level L, $Y_{-1}=n_{RNTI}$=tdd−config−RNTI≠0, A=39827, D=65537 and k=$\lfloor n_s/2 \rfloor$, where $n_s$ is the slot number within a radio frame and an aggregation level L ∈{1, 2, 4, 8} is defined by a set of PDCCH candidates, and $N_{CCE,k}$ is the total number of Control Channel Elements (CCEs) in a control region of subframe k. In one embodiment, in a PDCCH UE-group-common search space for a serving cell on which the PDCCH is monitored, when the monitoring UE is configured with a carrier indicator field then m'=m+$M^{(L)} \cdot n_{CI}$, where $n_{CI}$ is the carrier indicator field value and $M^{(L)}$ is the number of PDCCH candidates to monitor in aggregation level L. In another embodiment, when the monitoring UE is not configured with a carrier indicator field then m'=m, where m=0, L, $M^{(L)}$−1 refer to the CCE index within a PDCCH with aggregation level L. $M^{(L)}$ is the number of PDCCH candidates to monitor in a selected search space.

Figure 13:
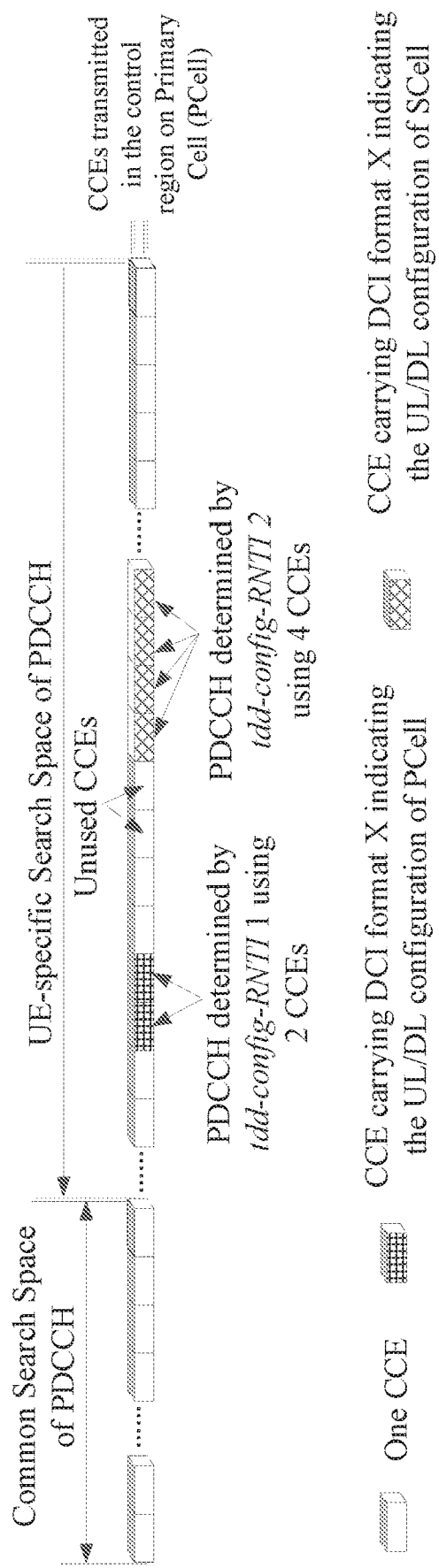
FIG. 13 illustrates a DC format X that includes a UL/DL configuration indication field in accordance with an example.

FIG. 13 illustrates that when a UE is not configured for enhanced physical downlink control channel (EPDCCH) monitoring and the UE is not configured with a carrier indicator field, the UE can monitor one PDCCH UE-group-common search space at each of the aggregation levels 1, 2, 4, 8.

Figure 14:
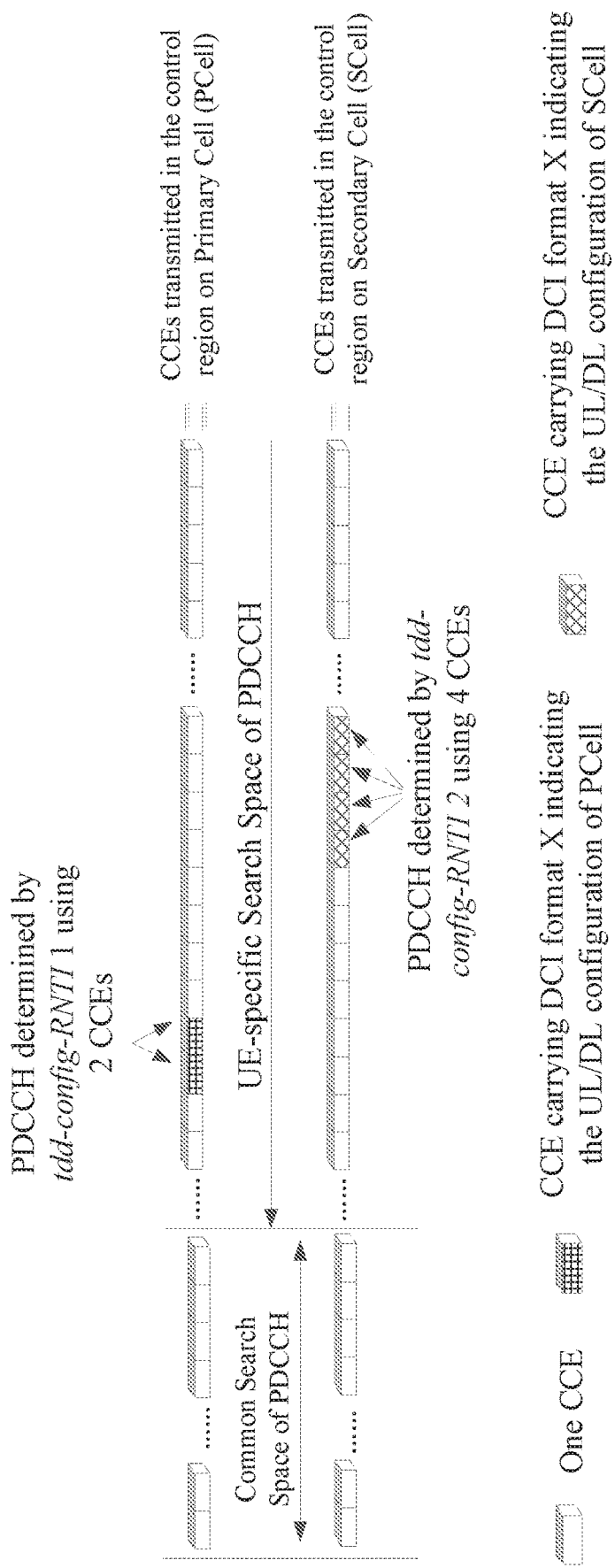
FIG. 14 illustrates a subset of aggregation levels on primary cell (PCell) in accordance with an example.

FIG. 14 illustrates that when a UE is not configured for EPDCCH monitoring and the UE is not configured with a carrier indicator field, a subset of aggregation levels on the PCell can be monitored. In another embodiment each serving cell that supports UL/DL re-configuration functionality in non-DRX fixed DL subframes or a portion of non-DRX fixed DL subframes can be monitored. FIG. 14 further illustrates PDCCH mapping, where a UE is configured with two serving cells and each serving cell supports UL/DL reconfiguration functionality. In one embodiment, control channel elements (CCEs) carrying UL/DL reconfiguration PDCCH for primary cell can be transmitted in the control region on the primary cell (PCell). In another embodiment, the CCEs carrying UL/DL reconfiguration PDCCH for secondary cell can be transmitted in the control region of the secondary cell (SCell).

In one embodiment, UEs are configured to monitor PDCCH UE-specific search space (USS) for obtaining a flexible UL-DL reconfiguration information. In another embodiment, monitoring the reconfiguration PDCCH carrying flexible UL-DL reconfigurations can increase the total blind decoding attempts number at UE side because of extra search space monitoring, unless the number of blind detections required by the UE specific search space on the serving cell are reduced to keep the overall blind detection number unchanged.

Figure 15:
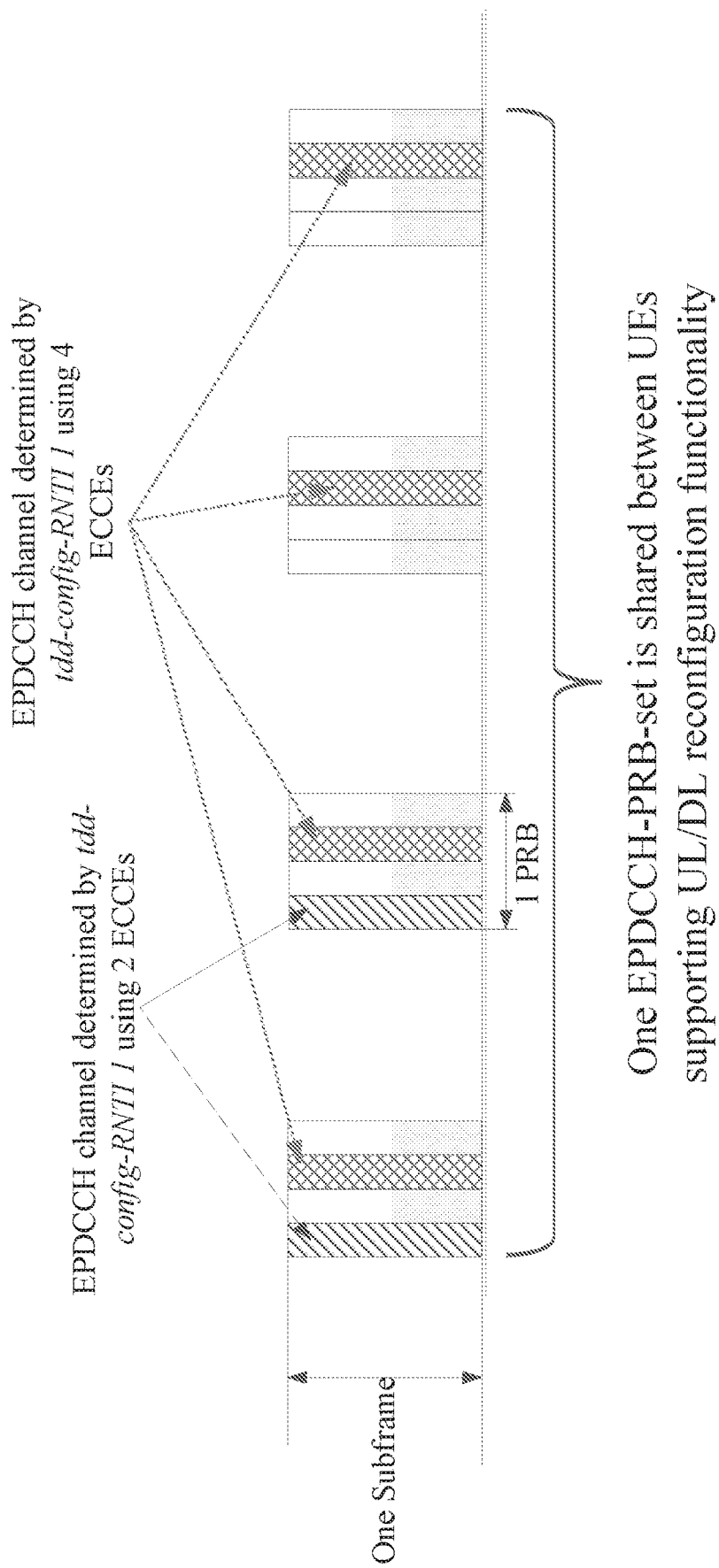
FIG. 15 illustrates an enhanced physical downlink control channel (EPDCCH) physical resource block (PRB) set that is configured to be shared by all UEs that are configured with EPDCCH monitoring in accordance with an example.

In one embodiment, a UE-group-common search space on an EPDCCH can be associated with an assigned RNTI value, such as a TDD-Config-RNTI. FIG. 15 illustrates one EPDCCH physical resource block (PRB) set that is configured to be shared by all UEs with EPDCCH monitoring. For a common EPDCCH-PRB-set used for DCI format X transmission, consisting of a set of enhanced control channel elements (ECCEs) numbered from 0 to $N_{ECCE,p,k}$−1, the ECCEs corresponding to EPDCCH candidate m of the search space $ES_k^{(L)}$ are given by $$L\left\{\left(Y_{p,k}+\left\lfloor \frac{m \cdot N_{ECCE,p,k}}{L \cdot M_p^{(L)}} \right\rfloor+b\right) \bmod \lfloor N_{ECCE,p,k}/L \rfloor\right\}+i,$$

where $Y_{p,k}=(A \cdot Y_{p,k-1})$ mod D, $Y_{-1}=n_{RNTI}$=tdd−confg−RNTI≠0, A=39827, $A_1$=39829, D=65537, k=$\lfloor n_s/2 \rfloor$, and aggregation level L ∈{1,2,4,8,16,32} is defined by a set of EPDCCH candidates, $Y_{p,k}$ is variable 'Y' value in EPDCCH-PRB-set P of subframe k, and, m=0,1,K $M_p^{(L)}$−1 is the ECCE index number within aggregation level L, $N_{ECCE,p,k}$ is the number of ECCEs in EPDCCH-PRB-set P of subframe k, $M_p^{(L)}$ is the number of EPDCCH candidates to monitor at aggregation level L in EPDCCH-PRB-set P for the serving cell on which EPDCCH is monitored, and c, when the UE is configured with a carrier indicator field for the serving cell on which EPDCCH is monitored, otherwise b=0, $n_{CI}$ is the carrier indicator field value, and $n_s$ is the slot number within a radio frame.

In one embodiment, when the UE is configured with a carrier indicator field for the serving cell on which the EPDCCH is monitored then $b=n_{CI}$, wherein $n_{CI}$ is the carrier indicator field value. In another embodiment, when the UE is not configured with a carrier indicator field for the serving cell on which EPDCCH is monitored then b=0. In one embodiment, the UE-group-common search space can be naturally distributed to obtain frequency and inference coordination diversity gain. In one embodiment, the UL/DL reconfiguration can be supported by a UE configured with EPDCCH monitoring.

Figure 16:
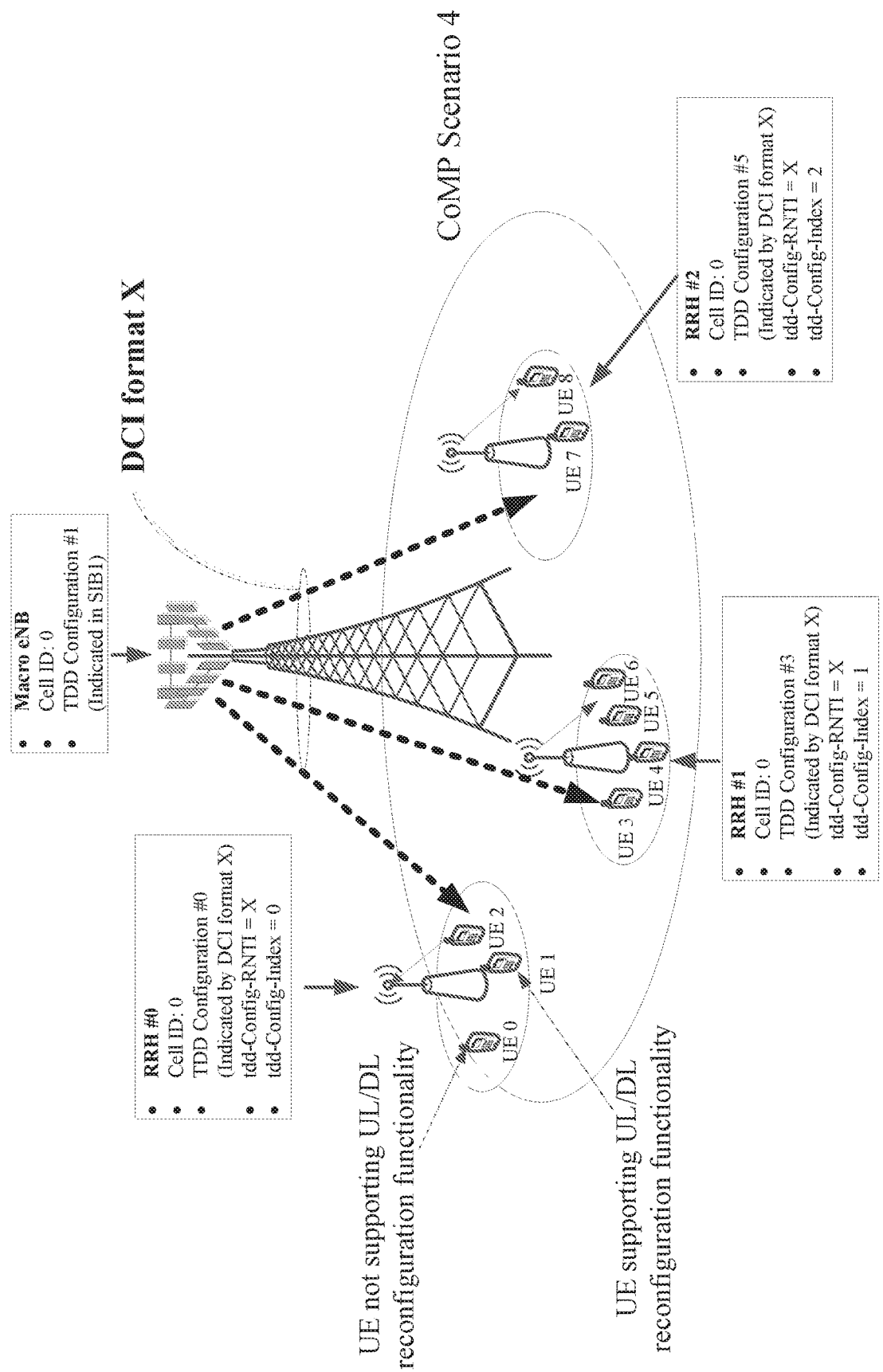
FIG. 16 illustrates a TDD UL/DL configuration supporting for cooperative multiple point (CoMP) Scenario 4 in accordance with an example.

FIG. 16 illustrates a TDD UL/DL configuration supporting for CoMP Scenario 4, in which each LPN or separated RRH Cell share the same physical cell ID with a Macro cell. In one embodiment, different TDD UL/DL configurations can be independently deployed at geographically separated RRHs in a CoMP Scenario 4. In one embodiment, in the CoMP scenario 4, the transmission points within a selected coverage area of a macro transmission point can share the same cell identification (cell ID), such as Cell ID 0 in FIG. 16. In one example, the transmission points can be a macro cell, a pico cell, an RRH, and/or another type of low power node (LPN).

In one embodiment, DCI format X transmissions from low power RRHs with the same cell IDs within a macro cell coverage area can be time-domain multiplexed by assigning the DCI format X transmissions to different subframe offsets. In one embodiment, the DCI format X transmissions can be assigned a same duty cycle or different duty cycles based on data traffic conditions or backhaul characteristic for the transmissions. In another embodiment, the UL/L configuration for different RRHs in CoMP Scenario 4 can be informed by separate TCI fields within a DCI format X transmission. The separate TCI fields within one DCI format X can provide a second dimension for a TDD UL/DL configuration indication in addition to a time-division multiplexing (TDM) over different subframe based solution. FIG. 16 illustrates that the UEs capable of UL/L reconfiguration (e.g. UE 1, UE 4, etc.) but associated with different transmission point can be configured with independent UL/DL configurations depending on traffic characteristic in each individual cell of transmission points. In one embodiment, a single UL/DL reconfiguration PDCCH can be allowed to be transmitted after the UE indicates the UL/DL reconfiguration capability to a EUTRAN.

When the UEs indicate the UL/DL reconfiguration capability to a EUTRAN, a set of parameters, such as a TDD-Config-RNTI and a TDD-Config-Index, can be communicated/configured to a UL/DL reconfiguration capable UE to aid the UE to monitor the DCI format X. FIG. 17 illustrates a table with the configurations for the TDD UL/DL reconfiguration indication. In one embodiment, the UEs can decode a UE-group-common search space for a DCI format X with a CRC scrambled by an assigned RNTI value (i.e. TDD-Config-RNTI). When the UE decodes the UE-group-common search space, the UE can determine a UL/DL configuration of one serving cell according to a corresponding TCI index value, i.e. TDD-Config-Index, within the DCI format X.

Figure 18:
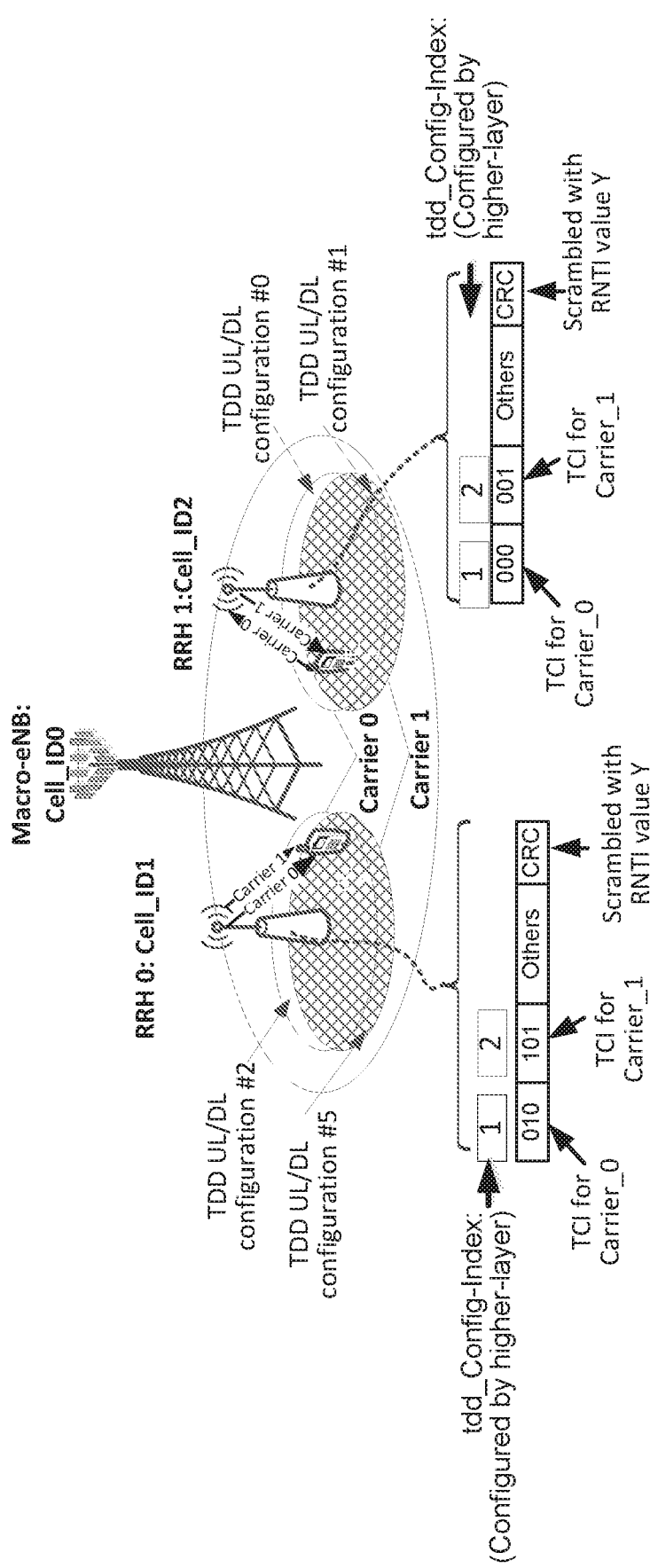
FIG. 18 illustrates a UL/DL configuration in a CoMP Scenario 3 in accordance with an example.

FIG. 18 illustrates a UL/DL configuration in a CoMP Scenario 3 with enabled CA at each RRH. The UL/DL configuration in CoMP Scenario 3 with an enabled CA at each RRH can enable traffic adaption across serving cells by allowing independent UL/DL configurations among different carriers and geographically different RRHs for a CoMP and CA scenario. FIG. 18 further illustrates that for a CoMP Scenario 3, the RRH can be configured as a cell with a Cell-ID. In one embodiment, for a CoMP Scenario 4 the RRH can be configured to share the same Cell-ID as a macro cell. FIG. 18 further shows seven different TDD UL/DL configurations, ranging from TDD UL/DL configuration 0-6, which allow a variety of downlink-uplink ratios (i.e. 40% to 90% DL ratio) and switching periodicities (i.e. 5 ms and 10 ms). As shown in FIG. 18, the serving cells deployed on carrier 0 of RRH 0 have a higher UL traffic than that on carrier 1, so RRH 0 configured UL/DL configuration 2 on Carrier 0 while configured UL/DL configuration 5 on Carrier 1 as the latter one provides more DL resources than the former one.

FIG. 19 shows a table with a set of TDD UL/DL configurations for a TDD UL/DL reconfiguration indication. The TDD UL/DL reconfiguration configuration parameters, such as RNTI or UL/DL configuration index (i.e. TDD-Config-Index) within DCI format X can be communicated to UEs, such as UE 0 and UE 1, through higher-layer signaling. In one embodiment, an RNTI value can be used across two RRHs for CoMP scenario 3 with CA enabling. In another embodiment, two distinct RNTI values, e.g. RNTI X and RNTI Y, or different TDD-Config-Index configurations can be assigned to UE 0 and UE 1 to enable an independent UL/DL configuration for each serving cell. In one embodiment, the TDD-Config-Index can be provided by higher layers and used to determine the index to the UL/DL configuration for a serving cell of a selected UE.

Figure 20:
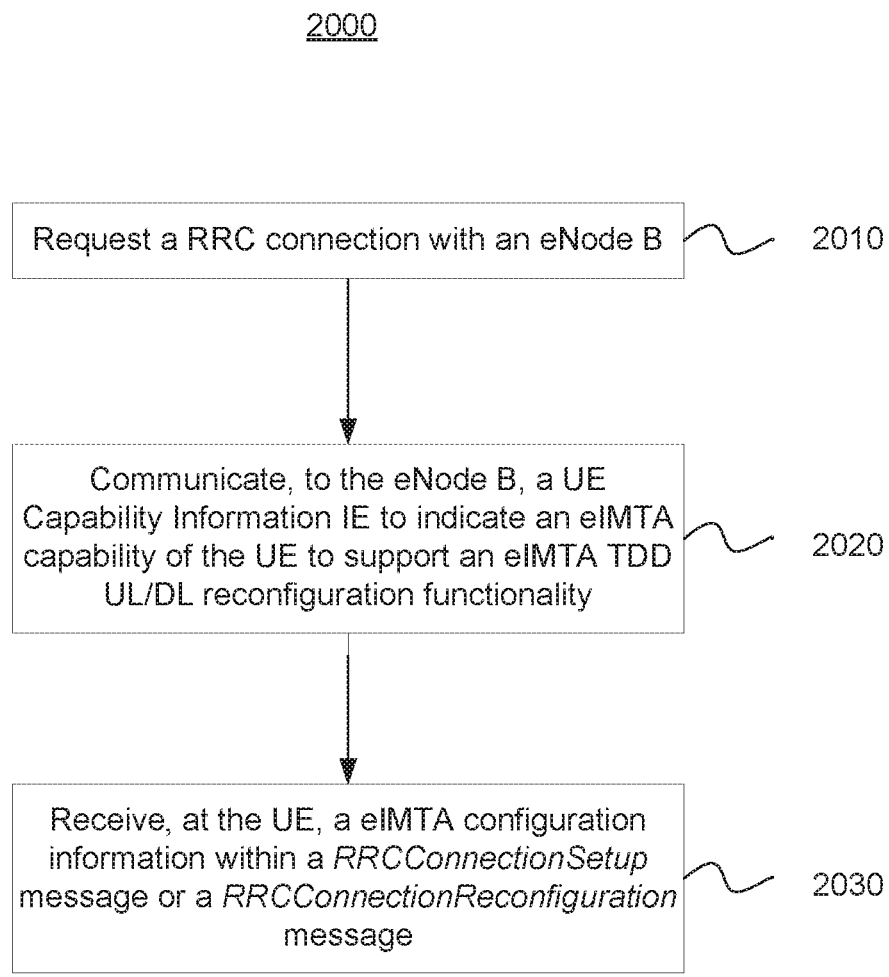
FIG. 20 depicts the functionality of a computer circuitry with a UE operable to dynamically change an UL/DL configuration in a communications network in accordance with an example.

Another example provides functionality 2000 of computer circuitry of a UE operable to dynamically change an uplink/downlink (UL/DL) configuration in a communications network, as shown in the flow chart in FIG. 20. The functionality can be implemented as a method or the functionality can be executed as instructions on a machine, where the instructions are included on at least one computer readable medium or one non-transitory machine readable storage medium. The computer circuitry can be configured to dynamically change an uplink/downlink (UL/DL) configuration in a communications network, as in block 2010. The computer circuitry can be further configured to communicate, to the eNode B, a UE Capability Information information element (IE) to indicate an enhanced interference mitigation and traffic adaptation (eIMTA) capability of the UE to support an eIMTA time duplex domain (TDD) UL/DL reconfiguration functionality, as in block 2020. The computer circuitry can be further configured to receive, at the UE, eIMTA configuration information within a RRCConnectionSetup message or a RRCConnecionReconfiguration message, as in block 2030.

In one embodiment, the RRCConnectionSetup message or the RRCConnectionReconfiguration message can include a eIMTA Radio-Network Temporary Identifier (RNTI) and a 2-bit or 3-bit UL/DL configuration indicator field index within the UL/DL reconfiguration physical downlink control channel (PDCCH) associated with a serving cell. In one embodiment, the computer circuitry can be configured to attempt to decode the UL/DL reconfiguration PDCCH with a cyclic redundancy check (CRC) scrambled by the assigned eIMTA-RNTI and determine UL/DL configuration information from a decoded UL/DL reconfiguration PDCCH based on an assigned indicator index.

In one embodiment, the computer circuitry can be configured to monitor one common search space (CSS) on a Primary Cell (PCell) to receive the UL/DL reconfiguration PDCCH with CRC scrambled by the eIMTA-RNTI assigned for the UE. In one embodiment, the computer circuitry can be configured to monitor one common search space (CSS) on a Primary Cell (PCell) to receive the UL/DL reconfiguration PDCCHs with CRCs scrambled by multiple different eIMTA-RNTIs separately, wherein each eIMTA-RNTI has a one-to-one mapping with a serving call index. In one embodiment, the computer circuitry can be configured to monitor search space (CSS) on each eIMTA-enabled serving cell to receive the UL/DL reconfiguration PDCCHs with CRC scrambled by one eIMTA-RNTI assigned for the UE.

In one embodiment, the computer circuitry can be configured to monitor a UE-group-common search space on a PDCCH on a Primary Cell (PCell) or each eMTA-enabled serving cell to receive the UL/DL reconfiguration PDCCHs with CRC scrambled by different eIMTA-RNTIs assigned for the UE for each serving cell, wherein the control channel elements (CCEs) corresponding to PDCCH candidate m of the UE-group-common search space $S_k^{(L)}$ can be determined using:

$$L\{(Y_k+m') \bmod \lfloor N_{CCE,k}/L \rfloor\}+i,$$

where aggregation level $L \in \{1,2,4,8\}$ can be defined by a set of PDCCH candidates and, $Y_k$ can be determined using:

$$Y_k=(A \cdot Y_{k-1}) \bmod D$$

where $Y_{-1}=n_{RNTI} \neq 0$, A=39827, D=65537 and $k=\lfloor n/2 \rfloor$, $n_s$ is a slot number within a radio frame, and the RNTI value used for $n_{RNTI}$ is the eIMTA-RNTI assigned for UL/DL reconfiguration PDCCH transmission.

In one embodiment, wherein m'=m when the monitoring UE is not configured with a carrier indicator field.

In one embodiment, wherein $m'=m+M^{(L)} \cdot n_{CI}$, where $n_{CI}$ is a carrier indicator field value, $m=0,L, M^{(L)}-1, M^{(L)}$ is a number of PDCCH candidates to monitor in a UE specific search space for aggregation level L, $N_{CCE,k}$ is a total number of CCEs in a control region of subframe k, and i=0,L, L-1 is a CCE index within a aggregation level L.

In one embodiment, the computer circuitry can be configured to monitor the UE-group-common search space on an enhanced PDCCH (EPDCCH) on a PCell only when cross-carrier scheduling is configured or on each eIMTA-enabled serving call when cross-carrier scheduling is not configured, to receive the UL/DL reconfiguration PDCCHs with CRC scrambled by multiple different eIMTA-RNTIs assigned for the UE, wherein enhanced control channel elements (ECCEs) corresponding to EPDCCH candidate m of a search space $ES_k^{(L)}$ can be given by:

$$L\left\{\left(Y_{p,k}+\left\lfloor \frac{m \cdot N_{ECCE,p,k}}{L \cdot M_p^{(L)}} \right\rfloor+b\right) \bmod \lfloor N_{ECCE,p,k}/L \rfloor\right\}+i,$$

where $Y_{p,k}$ is defined below and i=0,L, L-1, $$Y_k=(A \cdot Y_{k-1}) \bmod D$$

where aggregation level $L \in \{1,2,4,8,16,32\}$ is defined by a set of EPDCCH candidates, $Y_{p,k}$ is variable 'Y' value in EPDCCH-physical resource block-set p of subframe k, and, $m=0,1,K M_p^{(L)}-1$ is an ECCE index number within aggregation level L, $N_{ECCE,p,k}$ is a number of ECCEs in EPDCCH-PRB-set p of subframe k, $M_p^{(L)}$ is a number of EPDCCH candidates to monitor at aggregation level L in EPDCCH-PRB-set p for a serving cell on which the EPDCCH is monitored, $b=n_{CI}$ if the UE is configured with a carrier indicator field for the serving cell on which EPDCCH is monitored, otherwise b=0; and $n_{CI}$ is the carrier indicator field value.

In one embodiment, the UL/DL reconfiguration PDCCH includes N TDD UL/L Configuration Indicator (TCI) fields, where N can be configured by the eNode B within an RRC signaling message for each eIMTA capable UE or N can be determined using $$N=\left\lfloor \frac{L_{format\ Y}-R_{others}}{M} \right\rfloor,$$

wherein $L_{format\ Y}$ is a payload size of an existing downlink control information (DCI) format Y before CRC attachment, $R_{others} \geq 0$ is a number of information bits used for selected functionalities, M is payload size for each UL/DL configuration indicator within UL/DL reconfiguration PDCCH, and format Y is mapped onto a common search space.

In one embodiment, the selected functionalities include Transmit Power Control (TPC) commands for physical uplink shared channel (PUSCH) transmission on flexible subframes. In another embodiment, zero-padding information bits can appended to TDD UL/DL configuration indicator fields until a UL/L reconfiguration PDCCH size is equal to a format Y size mapped onto the common search space.

Figure 21:
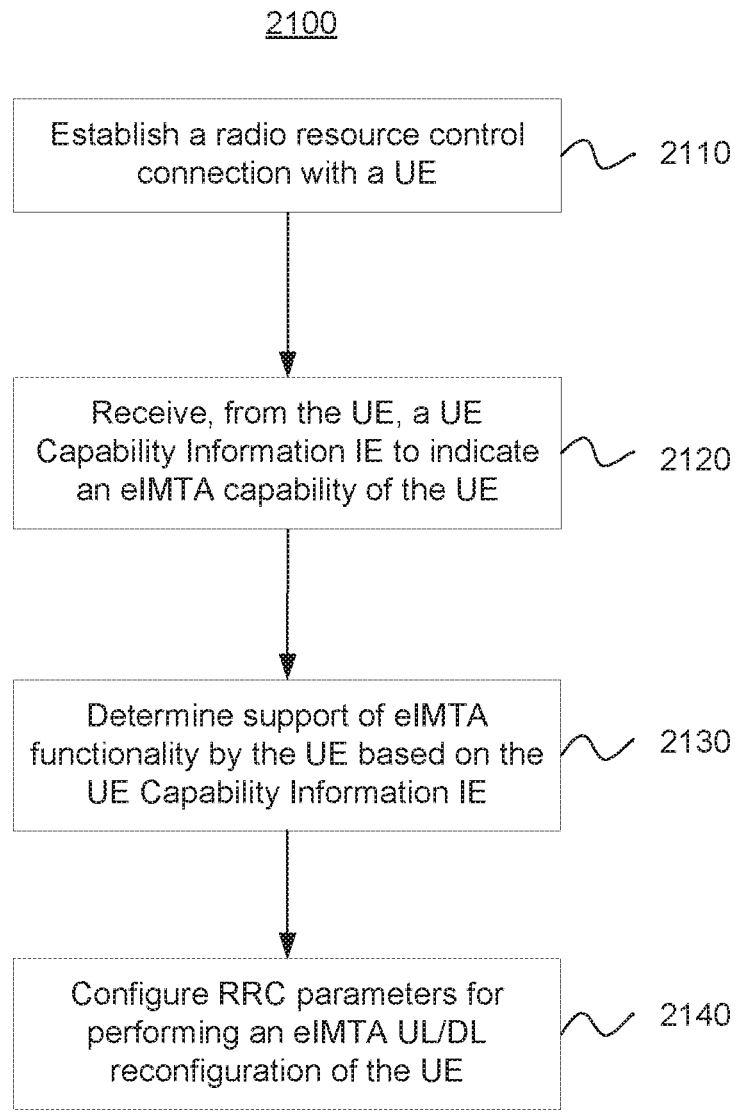
FIG. 21 depicts the functionality of another computer circuitry with an enhanced Node B (eNode B) operable to dynamically change a TDD UL/DL configuration in a communications network in accordance with an example.

Another example provides functionality 2100 of computer circuitry of an eNode B operable to dynamically change a time duplex domain (TDD) uplink/downlink (UL/DL) configuration in a communications network, as shown in the flow chart in FIG. 21. The functionality can be implemented as a method or the functionality can be executed as instructions on a machine, where the instructions are included on at least one computer readable medium or one non-transitory machine readable storage medium. The computer circuitry can be configured to establish a radio resource control connection with a user equipment (UE), as in block 2110. The computer circuitry can be further configured to receive, from the UE, a UE Capability Information information element (IE) to indicate an enhanced interference mitigation and traffic adaptation (eIMTA) capability of the UE, as in block 2120. The computer circuitry can be further configured to determine support of eIMTA functionality by the UE based on the UE Capability Information IE, as in block 2130. The computer circuitry can be further configured to configure radio resource control (RRC) parameters for performing an eIMTA UL/DL reconfiguration of the UE, as in block 2140.

Figure 22:
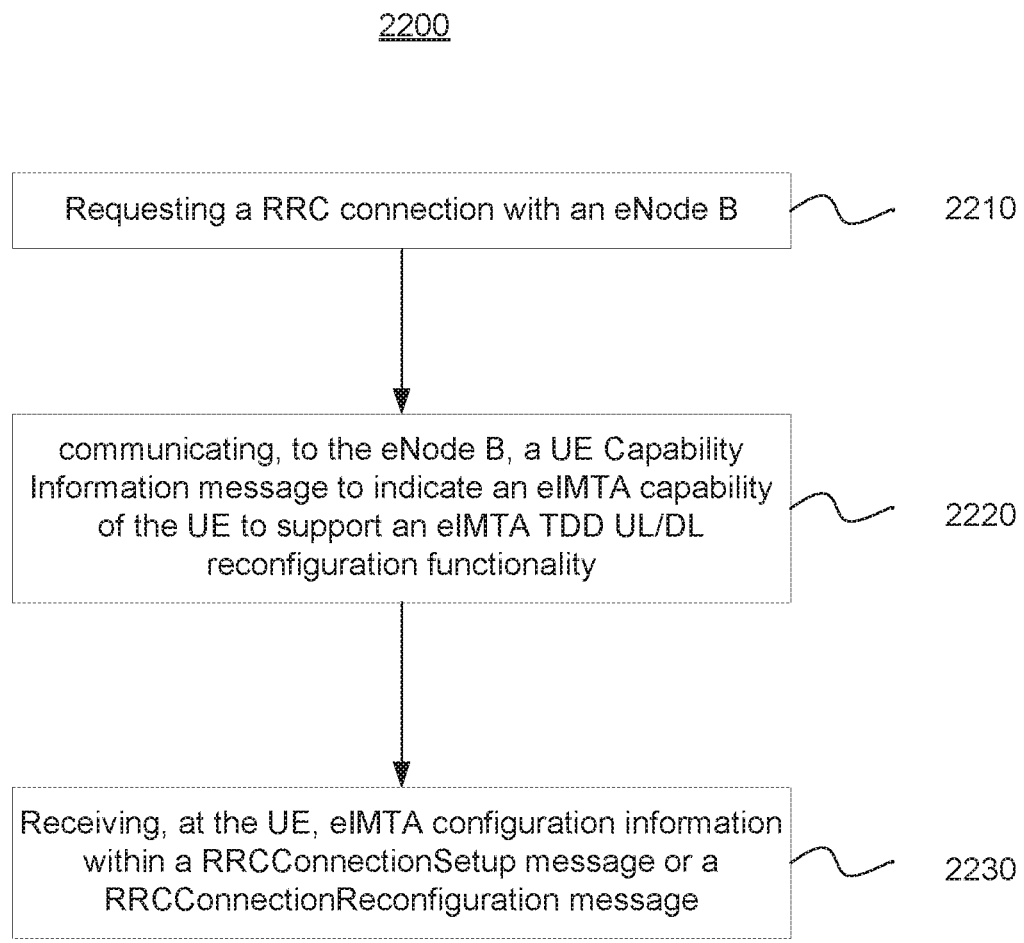
FIG. 22 illustrates a method for dynamically changing an UL/DL ratio in a communications network in accordance with an example.

In one embodiment, the computer circuitry can be configured to communicate, to the UE, eIMTA parameters associated with a secondary cell (SCell) of the eNode B. In another embodiment, the RRC parameters can include an eIMTA radio network temporary identities (RNTI) of the UE and an indicator index FIG. 22 uses a flow chart 2200 to illustrate a method for dynamically changing an uplink/downlink ratio in a communications network. The method can comprise requesting a radio resource control (RRC) connection with an enhanced node B (eNode B), as in block 2210. The method can further comprise communicating, to the eNode B, a user equipment (UE) Capability Information message to indicate an enhanced interference mitigation and traffic adaptation (eIMTA) capability of the UE to support an eIMTA time duplex domain (TDD) UL/DL reconfiguration functionality, as in block 2220. The method can further comprise receiving, at the UE, eIMTA configuration information within a RRCConnectionSetup message or a RRCConnectionReconfiguration message, as shown in block 2230.

In one embodiment, the RRCConnecdonSetup message or the RRCConnectionReconfiguration message includes a eIMTA Radio-Network Temporary Identifier (RNTI) and a 2-bit or 3-bit UL/DL configuration indicator field index within a UL/DL reconfiguration physical downlink control channel (PDCCH) associated with a serving cell. In another embodiment, a UL/DL reconfiguration physical downlink control channel (PDCCH) includes N TCI fields, where N can be configured by the eNode B within an RRC signaling message for each eMTA capable UE or N is determined using $$N = \left\lfloor \frac{L_{format\ Y} - R_{others}}{M} \right\rfloor,$$

wherein $L_{format\ Y}$ is a payload size of an existing downlink control information (DCI) format Y before CRC attachment, $R_{others} \geq 0$ is a number of information bits used for selected functionalities, M is a size of a target cell identifier (TCI) code word within the UL/DL reconfiguration PDCCH, and format Y is mapped onto a common search space.

In one embodiment, the existing DCI format Y mapped onto the common search space can be a DCI format 1C. In another embodiment, the existing DCI format Y mapped onto the common search space can be a DCI format 0/1A/3/3A. In another embodiment, the TCI code word size of M can be 3 bits and each TCI code word can be a different UL/DL configuration. In another embodiment, the UL/DL reconfiguration PDCCH mapped onto the common search space can be configured to enable independent UL/DL configurations for each serving cell in a single carrier scenario, a coordinated multiple point (CoMP) scenario 3, a CoMP scenario 4, a carrier aggregation (CA) scenario, and a combination of a CA and CoMP scenario.

In one embodiment, the method can further comprise receiving, at the UE, eIMTA configuration parameters and an indicator index associated with a secondary cell (SCell) of the UE and determining a UL/DL configuration for the SCell based on a received indicator index within a received UL/DL reconfiguration PDCCH. In another embodiment, a UL/DL configuration indicator field within a UL/DL reconfiguration PDCCH can be 2 bits or 3 bits. In one embodiment, the method can further comprise transmitting the DCI format on all system information block 1 (SIB1) DL subframes and determining, at a discontinuous reception (DRX) UE, an UL/DL configuration when the DRX UE c in a flexible subframe.

Figure 23:
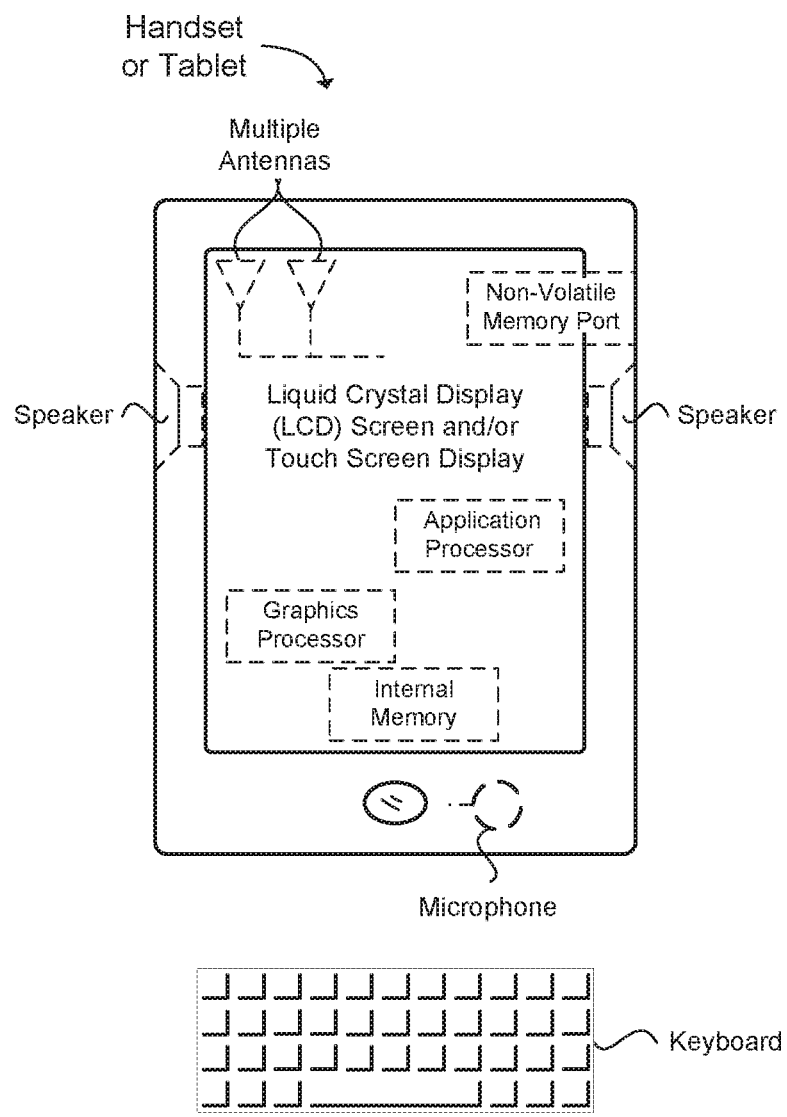
FIG. 23 illustrates a diagram of a UE in accordance with an example.

FIG. 23 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method, by a user equipment (UE), for dynamically changing an uplink/downlink (UL/DL) ratio in a communications network, comprising:
    requesting a radio resource control (RRC) connection with a base station;
    communicating, to the base station, a UE capability information message indicating support for a time duplex domain (TDD) UL/DL reconfiguration functionality; and
    receiving configuration information within an RRC connection message,
    wherein the RRC connection message includes:
        a first Radio-Network Temporary Identifier (RNTI); and
        a 2-bit or 3-bit UL/DL configuration indicator field index within a UL/DL reconfiguration physical downlink control channel (PDCCH) associated with a serving cell.

2. The method of claim 1, further comprising:
    attempting to decode the UL/DL reconfiguration PDCCH with a cyclic redundancy check (CRC) scrambled by a parameter assigned for the UE; and
    determining UL/DL configuration information from a decoded UL/DL reconfiguration PDCCH based on the assigned indicator field index.

3. The method of claim 2, further comprising monitoring one common search space (CSS) on a Primary Cell (PCell) to receive the UL/DL reconfiguration PDCCH with CRC scrambled by the parameter assigned for the UE.

4. The method of claim 2, further comprising monitoring one common search space (CSS) on a Primary Cell (PCell) to receive the UL/DL reconfiguration PDCCHs with CRCs scrambled by multiple different parameters separately.

5. The method of claim 2, further comprising monitoring a common search space (CSS) on each serving cell to receive the UL/DL reconfiguration PDCCHs with CRC scrambled by the parameter assigned for the UE.

6. The method of claim 5, further comprising monitoring a UE-group-common search space on a PDCCH on a Primary Cell (PCell) to receive the UL/DL reconfiguration PDCCHs for each serving cell, wherein the control channel elements (CCEs) corresponding to PDCCH candidate m of the UE-group-common search space $S_k^{(L)}$ are determined using:

$$L\{(Y_k+m') \bmod \lfloor N_{CCE,k}/L \rfloor\}+i,$$

where aggregation level $L\varepsilon\{1,2,4,8\}$ is defined by a set of PDCCH candidates and, $Y_k$ is determined using:

$$Y_k=(A \cdot Y_{k-1}) \bmod D$$

where $Y_{-1}=n_{RNTI} \neq 0$, $A=39827$, $D=65537$ and $k=\lfloor n_s/2 \rfloor$, $n_s$ is a slot number within a radio frame, and the RNTI value used for $n_{RNTI}$ is the RNTI assigned for UL/DL reconfiguration PDCCH transmission.

7. The method of claim 6, wherein m'=m when the monitoring UE is not configured with a carrier indicator field.

8. The method of claim 5, wherein $m'=m+M^{(L)} \cdot n_{CI}$, where $n_{CI}$ is a carrier indicator field value, $m=0, \ldots, M^{(L)}-1$, $M^{(L)}$ is a number of PDCCH candidates to monitor in a UE specific search space for an aggregation level L, $N_{CCE,k}$ is a total number of CCEs in a control region of subframe k, and $i=0, \ldots,$ and L-1 is a CCE index within the aggregation level L.

9. The method of claim 5, further configured to monitor the UE-group-common search space on an enhanced PDCCH (EPDCCH) on a PCell only when cross-carrier scheduling is configured or on each serving cell when cross-carrier scheduling is not configured, to receive the UL/DL reconfiguration PDCCHs with CRC scrambled by multiple different parameters assigned for the UE.

10. The method of claim 2, wherein the UL/DL reconfiguration PDCCH includes N TDD UL/DL Configuration Indicator (TCI) fields, where N is configured by the base station within an RRC signaling message for each eIMTA capable UE or N is determined using $N=\lfloor (L_{formatY}-R_{others})/M \rfloor$, wherein $L_{formatY}$ is a payload size of an existing downlink control information (DCI) format Y before CRC attachment, $R_{others} \geq 0$ is a number of information bits used for selected functionalities, M is payload size for each UL/DL configuration indicator within UL/DL reconfiguration PDCCH, and format Y is mapped onto a common search space.

11. The method of claim 10, wherein the selected functionalities include Transmit Power Control (TPC) commands for physical uplink shared channel (PUSCH) transmission on flexible subframes.

12. The method of claim 10, wherein zero-padding information bits are appended to TDD UL/DL configuration indicator fields until a UL/DL reconfiguration PDCCH size is equal to a format Y size mapped onto the common search space.

13. A method, by a base station, for dynamically changing a time duplex domain (TDD) uplink/downlink (UL/DL) configuration in a communications network, comprising:

establishing a radio resource control (RRC) connection with a user equipment (UE);

receiving, from the UE, a UE capability information message;

determining, from the UE capability information message, support by the UE for a time duplex domain (TDD) UL/DL reconfiguration functionality; and sending an RRC connection message to the UE, the RRC connection message comprising configuration information, wherein the RRC connection message includes:
- a first Radio-Network Temporary Identifier (RNTI); and
- a 2-bit or 3-bit UL/DL configuration indicator field index within a UL/DL reconfiguration physical downlink control channel (PDCCH) associated with a serving cell.

14. The method of claim 13, further comprising communicating, to the UE, configuration parameters associated with a secondary cell (SCell) of the base station.

* * * * *